United States Patent
Takami et al.

(10) Patent No.: US 8,021,567 B2
(45) Date of Patent: Sep. 20, 2011

(54) OXIDE-TYPE, MAGNETIC MATERIAL AND IT'S PRODUCTION METHOD, AND SINTERED FERRITE MAGNET AND IT'S PRODUCTION METHOD

(75) Inventors: Takashi Takami, Saitama-ken (JP); Hiroshi Iwasaki, Saitama-ken (JP); Naoki Mochi, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/902,220

(22) Filed: Oct. 12, 2010

(65) Prior Publication Data

US 2011/0024672 A1 Feb. 3, 2011

Related U.S. Application Data

(62) Division of application No. 11/814,266, filed as application No. PCT/JP2006/304805 on Mar. 10, 2006, now Pat. No. 7,837,893.

(30) Foreign Application Priority Data

Nov. 25, 2005 (JP) ................................. 2005-341274

(51) Int. Cl.
*H01F 1/11* (2006.01)
(52) U.S. Cl. ................. 252/62.63; 252/62.58; 252/62.57

(58) Field of Classification Search .................. None
See application file for complete search history.

(56) References Cited

U.S. PATENT DOCUMENTS

| 6,372,325 | B1 | 4/2002 | Ejiri et al. |
| 2004/0251997 | A1 | 12/2004 | Morel et al. |
| 2006/0284136 | A1* | 12/2006 | Takami et al. ............. 252/62.63 |

FOREIGN PATENT DOCUMENTS

| FR | 2831317 | | 4/2003 |
| GB | 747737 | | 4/1956 |
| JP | 11-97225 | A | 4/1999 |
| JP | 2000-223307 | | 8/2000 |
| JP | 2001-15316 | A | 1/2001 |
| JP | 2001-68319 | A | 3/2001 |
| JP | 2001-68320 | A | 3/2001 |
| JP | 2003-272941 | A | 9/2003 |
| JP | 2005-32745 | A | 2/2005 |
| WO | 2005-027153 | A1 | 3/2005 |
| WO | WO 2005/027153 | * | 3/2005 |

* cited by examiner

*Primary Examiner* — C. Melissa Koslow
(74) *Attorney, Agent, or Firm* — Sughrue Mion, PLLC

(57) ABSTRACT

A sintered ferrite magnet having an M-type ferrite structure and comprising Ca, an R element which is at least one rare earth element indispensably including La, Ba, Fe and Co as indispensable elements, which is represented by $Ca_{1-x-y}R_xBa_yFe_{2n-z}Co_z$, wherein $(1-x-y)$, x, y, z and n are numbers representing the amounts of Ca, the R element, Ba and Co and a molar ratio, meeting $0.2 \leq x \leq 0.65$, $0.001 \leq y \leq 0.2$, $0.03 \leq z \leq 0.65$, and $4 \leq n \leq 7$.

2 Claims, 12 Drawing Sheets

OXIDE-TYPE, MAGNETIC MATERIAL AND IT'S PRODUCTION METHOD, AND SINTERED FERRITE MAGNET AND IT'S PRODUCTION METHOD

This is a divisional of application Ser. No. 11/814,266 filed Jul. 18, 2007, now U.S. Pat. No. 7,837,893, which is a 371 of PCT/JP/2006/304805 filed Mar. 10, 2006. The entire disclosure of the prior application, application Ser. No. 11/814,266 is considered part of the disclosure of the accompanying divisional application and is hereby incorporated by reference.

FIELD OF THE INVENTION

The present invention relates to a new, high-performance, sintered ferrite magnet having higher residual magnetic flux density Br and coercivity HcJ than those of conventional sintered ferrite magnets, which is extremely useful in a wide range of magnet applications including rotors for automobiles and electric appliances, magnet rolls for copiers, etc., and its production method, particularly to a practically useful method for producing a high-performance sintered ferrite magnet with high dewatering efficiency during wet molding and with less likelihood of cracking in a green body. The present invention also relates to a new, oxide-type, magnetic material (particularly calcined body) capable of providing the above high-performance sintered ferrite magnet, and its production method.

BACKGROUND OF THE INVENTION

Sintered ferrite magnets having magnetoplumbite-type (M-type) structures are used in various applications including motors, rotors of electric generators, etc. Sintered ferrite magnets having higher magnetic properties are recently required for the purpose of reduction in size and weight of motors for automobiles and increase in efficiency of motors for electric appliances. Particularly, sintered ferrite magnets used for rotors for automobiles are required to have not only high Br for reduction in size and weight, but also high HcJ to be resistant to demagnetization, when it is subjected to a demagnetization field generated by thinning them.

M-type sintered ferrite magnets such as Sr ferrite, Ba ferrite, etc. have conventionally been produced by the following steps. An iron oxide and a Sr or Ba carbonate, etc. are mixed and calcined to produce calcined clinker by a ferritization reaction. The calcined clinker is coarsely pulverized, and a predetermined amount of the resultant coarse powder is charged into a fine pulverizer, together with $SiO_2$, $SrCO_3$, $CaCO_3$, etc. for controlling sintering behavior, and $Al_2O_3$ or $Cr_2O_3$ for controlling Hcj, if necessary, and wet fine pulverization is conducted with water as a medium to an average particle size of about 0.5 μm. The resultant slurry containing fine ferrite particles is molded in a magnetic field, dried and then sintered. The resultant sintered body is machined to a predetermined shape to provide a sintered ferrite magnet.

In the above production, when fine powder particles in the slurry obtained by fine pulverization in a wet state have an average particle size of less than 0.7 μm, the dewatering of a green body in a slurry-molding step in a magnetic field takes remarkably long time, resulting in drastic decrease in the number of moldings formed per unit time (molding efficiency). This problem makes sintered ferrite magnets more expensive. If a slurry containing fine powder having an average particle size of 0.7 μm or more is molded in a magnetic field, increase in the average particle size remarkably improves molding efficiency but drastically deteriorates the magnetic properties of a sintered ferrite magnet. This phenomenon is clear from the later-described behavior shown in FIGS. 12(a) and 12(b). Also, because fine pulverization results in low wet-molding efficiency, it is necessary to use magnetic material powder having a relatively large average particle size.

Japanese Patent 3,181,559 discloses a sintered ferrite magnet comprising hexagonal ferrite as a main phase, and having a composition represented by the general formula: $Ca_{1-x}R_x(Fe_{12-y}M_y)_zO_{19}$, wherein R is at least one element selected from the group consisting of rare earth elements (including Y) and Bi, La being indispensable, M is Co and/or Ni, and x, y and z meet the conditions of $0.2 \leq x \leq 0.8$, $0.2 \leq y \leq 1.0$, and $0.5 \leq z \leq 1.2$. In FIG. 2 in Example 2 of Japanese Patent 3,181,559, Sample No. 2 sintered with 20% of $O_2$ has Br of 4.4 kG (440 mT) and HcJ of 3.93 kOe (313 kA/m). Although it is described that the fine pulverization of Sample No. 2 was conducted for 40 hours in xylene with a ball mill, the average particle size of the resultant fine powder is not described. Japanese Patent 3,181,559 reports in Paragraph 18 and Example 6 that the sintered ferrite magnet described therein has about 2% higher saturation magnetization (4πIs) and about 10% higher anisotropic magnetic field ($H_A$) than those of SrM. This potential of 4πIs and $H_A$ may make it possible to achieve Br of 4.6 kG (460 mT) or more and about 10-% increase in the maximum of HcJ, which would not be achieved by SrM. In view of this, Br and HcJ of Sample No. 2 are lower than the inherent potential of magnetic properties, leaving room for improvement. Although Japanese Patent 3,181,559 describes a composition encompassing the composition range of the sintered ferrite magnet of the present invention, it neither describes nor suggests the addition of a small amount of Ba to remarkably improve powder characteristics and magnetic properties.

JP11-97225A discloses an anisotropic sintered magnet comprising hexagonal, magnetoplumbite-type ferrite as a main phase, which has a composition represented by the general formula of $Ba_{1-x}R_x(Fe_{12-y}M_y)_zO_{19}$, wherein R is at least one selected from the group consisting of rare earth elements (including Y) and Bi, M is Co or Co and Zn, $0.04 \leq x \leq 0.9$, $0.3 \leq y \leq 0.8$, and $0.7 \leq z \leq 1.2$. Although Table 1 lists the composition of each calcined sample corresponding to the above anisotropic sintered magnet, each composition is outside the composition range of the present invention because of too much Ba or too little Ca. Further, FIG. 1 shows low Br and HcJ.

WO 2005/027153A discloses a sintered ferrite magnet having an M-type ferrite structure, and comprising an A element which is Sr or Sr and Ba, an R element which is at least one rare earth element including Y (indispensably including La), Ca, Fe and Co as indispensable elements, the sintered ferrite magnet being produced by pulverizing, molding and sintering an oxide-type, magnetic material. The basic composition of the oxide-type, magnetic material is represented by the following general formula (1):

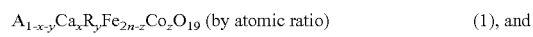

and the basic composition of the sintered ferrite magnet is represented by the following general formula (2):

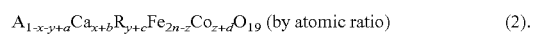

In the general formulae (1) and (2), x, y, z and n respectively represent the amounts of Ca, the R element and Co and a molar ratio in the oxide-type, magnetic material, and a, b, c and d respectively represent the amounts of the A element, Ca, the R element and Co added to the oxide-type, magnetic material in the pulverizing step, each meeting the following conditions: $0.03 \leq x \leq 0.4$, $0.1 \leq y \leq 0.6$, $0 \leq z \leq 0.4$, $4 \leq n \leq 10$, $x+y<1$, $0.03 \leq x+b \leq 0.4$, $0.1 \leq y+c \leq 0.6$, $0.1 \leq z+d \leq 0.4$, $0.50 \leq [(1-x-y+a)/(1-y+a+b)] \leq 0.97$, $1.1 \leq (y+c)/(z+d) \leq 1.8$, $1.0 \leq (y+c)/x \leq 20$, and $0.1 \leq x/(z+d) \leq 1.2$. However, this sintered ferrite magnet is not included in the composition range of the present invention, because it indispensably contains Sr, and because the amount of Sr or (Sr+Ba) is more than the amount of Ca. Although the sintered ferrite magnet described in WO 2005/027153A has high magnetic properties, further improvement in magnetic properties is desired because of increasingly higher demand of performance by users.

OBJECTS OF THE INVENTION

Accordingly, a first object of the present invention is to provide a new, high-performance, sintered ferrite magnet having higher Br and HcJ than those of conventional sintered ferrite magnets, and its production method, particularly, a method for producing a practically useful, high-performance, sintered ferrite magnet with high dewatering efficiency during wet molding, free from cracking in a green body.

A second object of the present invention is to provide a new, oxide-type, magnetic material, particularly calcined body, capable of providing the high-performance sintered ferrite magnet, and its production method.

DISCLOSURE OF THE INVENTION

The oxide-type, magnetic material of the present invention is based on ferrite having a hexagonal structure, and comprises Ca, an R element which is at least one rare earth element indispensably including La, Ba, Fe and Co as indispensable elements, the composition ratios of Ca, R, Ba, Fe and Co being represented by the following general formula:

$Ca_{1-x-y}R_xBa_yFe_{2n-z}Co_z$ (by atomic ratio), wherein $(1-x-y)$, x, y, z and n are numbers representing the amounts of Ca, the R element, Ba and Co and a molar ratio, respectively, meeting the following conditions:

$0.2 \leq x \leq 0.65$, $0.001 \leq y \leq 0.2$, $0.03 \leq z \leq 0.65$, and $4 \leq n \leq 7$.

In the oxide-type, magnetic material of the present invention, the amount ratio x/z of the R element to Co preferably meets $1 \leq x/z \leq 3$.

The oxide-type, magnetic material of the present invention preferably has an M phase as a main phase.

The oxide-type, magnetic material of the present invention preferably has an M-type ferrite structure.

The oxide-type, magnetic material of the present invention is useful for practical applications in the form of a calcined body.

High magnetic properties can be obtained, when 30% or more, preferably 50% or more, more preferably 60% or more, of primary particles in the calcined body of the present invention are in a hexagonal plate shape. The term "having a hexagonal plate shape" means that the growth rate of an M phase is high, so that the powder characteristics of starting materials for molding and the magnetic properties of the sintered ferrite magnet are remarkably improved.

High magnetic properties can be obtained, when 30% or more, preferably 50% or more, more preferably 60% or more, of primary particles in the calcined body of the present invention have an aspect ratio (particle size/thickness) of 5 or less. A smaller aspect ratio provides higher demagnetization resistance, resulting in higher HcJ, higher orientation of the sintered body, and higher Br.

The method for producing an oxide-type, magnetic material of the present invention, which is based on ferrite having a hexagonal structure, and comprises Ca, an R element which is at least one rare earth element indispensably including La, Ba, Fe and Co as indispensable elements, the composition ratios of Ca, R, Ba, Fe and Co being represented by the following general formula:

$Ca_{1-x-y}R_xBa_yFe_{2n-z}Co_z$ (by atomic ratio), wherein $(1-x-y)$, x, y, z and n are numbers representing the amounts of Ca, the R element, Ba and Co and a molar ratio, respectively, meeting the following conditions:

$0.2 \leq x \leq 0.65$, $0.001 \leq y \leq 0.2$, $0.03 \leq z \leq 0.65$, and $4 \leq n \leq 7$, comprises the steps of mixing a Ca compound, an R compound, a Ba compound, an iron compound and a Co compound to the composition, and calcining the resultant mixture.

In the method of the present invention for producing an oxide-type, magnetic material, calcining is preferably conducted in an atmosphere having an oxygen partial pressure of 0.05-1 atm.

The sintered ferrite magnet of the present invention has an M-type ferrite structure, and comprises Ca, an R element which is at least one rare earth element indispensably including La, Fe and Co as indispensable elements, the composition ratios of Ca, R, Ba, Fe and Co being represented by the following general formula:

$Ca_{1-x-y}R_xBa_yFe_{2n-z}Co_z$ (by atomic ratio), wherein $(1-x-y)$, x, y, z and n are numbers representing the amounts of Ca, the R element, Ba and Co and a molar ratio, respectively, meeting the following conditions:

$0.2 \leq x \leq 0.65$, $0.001 \leq y \leq 0.2$, $0.03 \leq z \leq 0.65$, and $4 \leq n \leq 7$.

In the sintered ferrite magnet of the present invention, the amount ratio x/z of the R element to Co preferably meets $1 \leq x/z \leq 3$.

The sintered ferrite magnet of the present invention has anisotropy, an average crystal grain size of M-type crystal grains being 0.9 μm or more along the direction of anisotropy, and 30% or more, preferably 50% or more, more preferably 60% or more, of the M-type crystal grains having an aspect ratio (particle size/thickness) of 3 or less to provide high magnetic properties.

The method of the present invention for producing a sintered ferrite magnet, which has an M-type ferrite structure, and comprises Ca, an R element which is at least one rare earth element indispensably including La, Ba, Fe and Co as indispensable elements, the composition ratios of Ca, R, Ba, Fe and Co being represented by the following general formula:

$$Ca_{1-x-y}R_xBa_yFe_{2n-z}Co_z \text{ (by atomic ratio)},$$

wherein (1−x−y), x, y, z and n are numbers representing the amounts of Ca, the R element, Ba and Co and a molar ratio, respectively, meeting the following conditions:

$$0.2 \leq x \leq 0.65,$$

$$0.001 \leq y \leq 0.2,$$

$$0.03 \leq z \leq 0.65, \text{ and}$$

$$4 \leq n \leq 7,$$

comprises a step of mixing starting materials therefor, a calcining step, a pulverizing step, a molding step and a sintering step.

In the method of the present invention for producing a sintered ferrite magnet, the amount ratio x/z of the R element to Co preferably meets $1 \leq x/z \leq 3$.

The method of the present invention for producing a sintered ferrite magnet preferably comprises the steps of finely pulverizing a calcined body to form fine powder having an average particle size of 0.4-1.3 μm, molding the resultant fine powder, and sintering the resultant green body in an atmosphere having an oxygen partial pressure of 0.05-1 atm.

The method of the present invention for producing a sintered ferrite magnet preferably comprises the steps of finely pulverizing a calcined body in a wet state to form a slurry for molding containing fine powder having an average particle size of 0.4-1.3 μm, molding the resultant slurry in a magnetic field, and sintering the resultant green body in an atmosphere having an oxygen partial pressure of 0.05-1 atm.

In the method of the present invention for producing a sintered ferrite magnet comprising a step of mixing starting materials, a step of calcining the resultant mixture, and a step of pulverizing the calcined product, a Ca compound, an R compound and an iron compound are preferably mixed in the step of mixing starting materials, and a Ba compound and a Co compound may be added in the step of mixing starting materials, and/or the step of pulverizing the calcined product. Namely, the following six production patterns are available, and the production pattern (2) is most preferable.

(1) Mixing a Ca compound, an R compound and an iron compound to form a Ca—R—Fe mixture in the mixing step of the starting materials, calcining the resultant Ca—R—Fe mixture, and adding at least a Ba compound and a Co compound to adjust the composition of the mixture to a desired one in the step of pulverizing the resultant calcined product.

(2) Mixing a Ca compound, an R compound, a Ba compound, an iron compound and a Co compound in the mixing step of the starting materials to adjust their composition to a desired one.

(3) Mixing a Ca compound, an R compound, part of a Ba compound (5% or more and less than 100% of the total y), an iron compound and a Co compound in the mixing step of the starting materials to form a Ca—R—Ba—Fe—Co mixture, and adding the balance of the Ba compound (more than 0% and 95% or less of the total y) in the pulverizing step after calcining to adjust the composition of the mixture to a desired one.

(4) Mixing a Ca compound, an R compound, an iron compound and a Co compound in the mixing step of the starting materials to form a Ca—R—Fe—Co mixture, and adding a Ba compound in the pulverizing step after calcining to adjust the composition of the mixture to a desired one.

(5) Mixing a Ca compound, an R compound, a Ba compound, an iron compound and part of a Co compound (5% or more and less than 100% of the total z) in the mixing step of the starting materials to form a Ca—R—Ba—Fe—Co mixture, and adding the balance of the Co compound (more than 0% and 95% or less of the total z) in the pulverizing step after calcining to adjust the composition of the mixture to a desired one.

(6) Mixing a Ca compound, an R compound, a Ba compound and an iron compound in the mixing step of the starting materials to form a Ca—R—Ba—Fe mixture, and adding a Co compound in the pulverizing step after calcining to adjust the composition of the mixture to a desired one.

In the oxide-type, magnetic material of the present invention (calcined body) and its production method, and the sintered ferrite magnet of the present invention and its production method, the composition ratios of Ca, R, Ba, Fe, Co and O are represented by the following general formula:

$$Ca_{1-x-y}R_xBa_yFe_{2n-z}Co_zO_\alpha \text{ (by atomic ratio)},$$

wherein (1−x−y), x, y, z, n and α are numbers representing the amounts of Ca, the R element, Ba and Co, a molar ratio and the amount of O, respectively, meeting the following conditions:

$$0.2 \leq x \leq 0.65,$$

$$0.001 \leq y \leq 0.2,$$

$$0.03 \leq z \leq 0.65, \text{ and}$$

$$4 \leq n \leq 7,$$

α being 19 in the case of stoichiometric composition ratios, in which x=z and n=6.

In the oxide-type, magnetic material of the present invention (calcined body) and the sintered ferrite magnet of the present invention, 50% or less of the Ba content (y) may be substituted with Sr. In the production method of the present invention, a Sr compound (SrCO$_3$ powder, etc.) may be added in the mixing step before calcining and/or in the pulverizing step after calcining, to substitute 50% or less of the Ba content (y) with Sr.

DESCRIPTION OF THE BEST MODE OF THE INVENTION

Figure 1A:
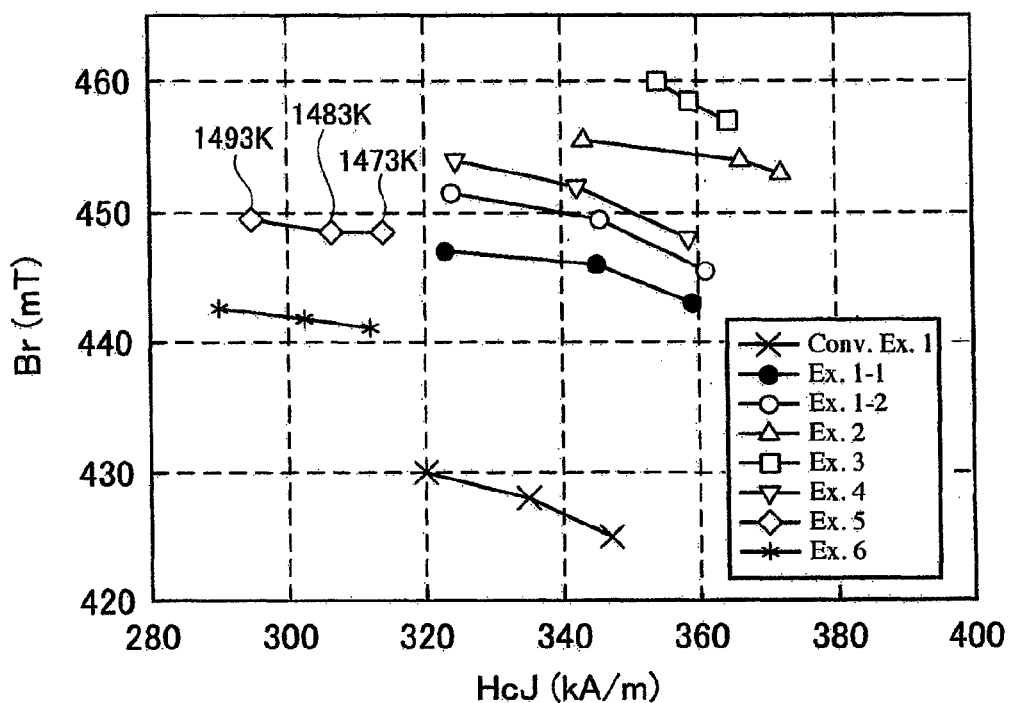
FIG. 1(a) is a graph showing the magnetic properties of the sintered ferrite magnets of Examples 1-6 and Conventional Example 1, in which three points in each case indicate experimental results obtained on the same composition at different sintering temperatures of 1473K, 1483K and 1493K from the right.

[1] Composition (A) Composition of Oxide Magnet Material

The oxide-type, magnetic material of the present invention is preferably based on ferrite having a hexagonal structure, and comprises Ca, an R element which is at least one rare earth element indispensably including La, Ba, Fe and Co as indispensable elements, having a basic composition in which the composition ratios of Ca, R, Ba, Fe and Co are represented by the following general formula:

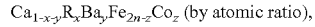

$Ca_{1-x-y}R_xBa_yFe_{2n-z}Co_z$ (by atomic ratio), wherein (1−x−y), x, y, z and n are numbers representing the amounts of the R element, Ba and Co and a molar ratio, respectively, meeting the following conditions:

$0.2 \leq x \leq 0.65$, $0.001 \leq y \leq 0.2$, $0.03 \leq z \leq 0.65$, and $4 \leq n \leq 7$.

The Ca content (1−x−y) in the oxide-type, magnetic material is preferably 0.15-0.795, more preferably 0.3-0.6, more preferably 0.35-0.55. When (1−x−y) is less than 0.15, the M phase is not stably formed, and excess R forms ortho-ferrite to lower magnetic properties. When (1−x−y) exceeds 0.795, undesirable phases such as $CaFeO_{3-x}$, etc. are formed.

The oxide-type, magnetic material may have a composition meeting $0.31 \leq x/z \leq 21.7$, preferably $1 \leq x/z \leq 3$, more preferably $1.2 \leq x/z \leq 2$. x/z represents a molar ratio (R/Co) of R to Co. When x/z is less than 0.31, undesirable phases containing much Co are remarkably generated, resulting in extreme decrease in the squareness ratio (Hk/HcJ). When x/z exceeds 21.7, undesirable phases such as ortho-ferrite, etc. are remarkably generated, resulting in drastic decrease in magnetic properties.

The oxide-type, magnetic material has an R content (x) of 0.2-0.65, preferably 0.3-0.6, more preferably 0.35-0.55, particularly 0.4-0.5. When x is less than 0.2, the substitution of the M phase with Co is insufficient, resulting in an unstable M-type ferrite structure and generating undesirable phases such as $CaO.Fe_2O_3$, $CaO.2Fe_2O_3$, etc., thus drastically decreasing magnetic properties. When x exceeds 0.65, unreacted R oxides increase, and undesirable phases such as ortho-ferrite, etc. are generated. R is at least one rare earth element such as La, Ce, Nd, Pr, etc., which indispensably includes La. To provide high magnetic properties, the proportion of La in R is preferably 50 atomic % or more, more preferably 70 atomic % or more, and La alone is particularly preferable, though inevitable impurities may be contained. La is most soluble among the R elements in the M phase, thereby being effective to improve magnetic properties.

The Ba content (y) in the oxide-type, magnetic material is 0.001-0.2, preferably 0.005-0.2, more preferably 0.01-0.2, further preferably 0.02-0.15, particularly 0.02-0.12. When y is less than 0.001, improvement in magnetic properties cannot be obtained by the addition of Ba. When y exceeds 0.2, the magnetic properties are rather decreased.

The Co contents (z) in the oxide-type, magnetic material is 0.03-0.65, preferably 0.1-0.55, more preferably 0.2-0.4. When z is less than 0.03, the addition of Co does not improve magnetic properties. In this case, because unreacted $\alpha$-$Fe_2O_3$ remains in the calcined body, the slurry extremely leaks from a mold cavity during wet molding. When z exceeds 0.65, undesirable phases containing much Co are generated, resulting in drastic decrease in the magnetic properties.

In the oxide-type, magnetic material, a molar ratio n is a value determined from (Ca+R+Ba) and (Fe+Co) by 2n=(Fe+Co)/(Ca+R+Ba). The molar ratio n is 4-7, preferably 4-6, more preferably 4.6-5.8, particularly 4.9-5.6. When n is less than 4, the oxide-type, magnetic material has a high proportion of a non-magnetic portion, and calcined particles are excessively flat, resulting in drastically lowered HcJ. When n exceeds 7, unreacted $\alpha$-$Fe_2O_3$ remarkably remains in the calcined body, and the slurry extremely leaks from a mold cavity during wet molding.

The oxide magnet material is preferably in the form of a calcined body. The calcined body containing 0.05-0.2% by mass (calculated as $B_2O_3$) of B and/or 0.05-0.2% by mass (calculated as $SiO_2$) of Si has high magnetic properties. When the amount of B or Si is less than 0.05% by mass, the magnetic properties are not improved. When it is more than 0.2% by mass, the magnetic properties rather decrease.

(B) Composition of Sintered Ferrite Magnet

The sintered ferrite magnet of the present invention has an M-type ferrite structure, and comprises Ca, an R element which is at least one rare earth element indispensably including La, Ba, Fe and Co as indispensable elements, having a basic composition in which the composition ratios of Ca, R, Ba, Fe and Co are represented by the following general formula:

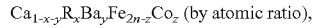

$Ca_{1-x-y}R_xBa_yFe_{2n-z}Co_z$ (by atomic ratio), wherein (1−x−y), x, y, z and n are numbers representing the amounts of Ca, the R element, Ba and Co and a molar ratio, respectively, meeting the following conditions:

$0.2 \leq x \leq 0.65$, $0.001 \leq y \leq 0.2$, $0.03 \leq z \leq 0.65$, and $4 \leq n \leq 7$.

The Ca content (1−x−y) in the sintered ferrite magnet is 0.15-0.795, preferably 0.3-0.65, more preferably 0.4-0.55. When (1−x−y) is less than 0.15, the M phase is unstable, and excess R forms ortho-ferrite which reduces the magnetic properties. When (1−x−y) exceeds 0.795, the M phase is not formed, but undesirable phases such as $CaFeO_{3-x}$, etc. are generated.

The R content (x) in the sintered ferrite magnet is 0.2-0.65, preferably 0.3-0.55, particularly 0.35-0.5. When x is less than 0.2, the substitution of the M phase with Co is insufficient, resulting in an unstable M-type ferrite structure. When x exceeds 0.65, unreacted R oxides increase, and undesirable phases such as ortho-ferrite, etc. are generated. R is at least one rare earth element such as La, Ce, Nd and Pr, indispensably including La. To impart high magnetic properties, the proportion of La in the R is preferably 50 atomic % or more, more preferably 70 atomic % or more, and La alone is particularly preferable though inevitable impurities may be contained.

The Ba content (y) in the sintered ferrite magnet is 0.001-0.2, preferably 0.005-0.2, more preferably 0.01-0.2, further preferably 0.02-0.15, particularly 0.02-0.12. When y is less than 0.001, the addition of Ba does not improve the magnetic properties. When y exceeds 0.2, the magnetic properties rather decrease.

The Co content (z) in the sintered ferrite magnet is 0.03-0.65, preferably 0.1-0.55, more preferably 0.2-0.4. When z is less than 0.03, the addition of Co does not improve the magnetic properties. When z exceeds 0.65, undesirable phases containing much Co are generated, resulting in drastic decrease in the magnetic properties.

The molar ratio n in the sintered ferrite magnet, which has the same meaning as that in the oxide-type, magnetic material, is 4-7, preferably 4-6, more preferably 4.5-5.5, particularly 4.6-5.4. When n is less than 4, the sintered ferrite magnet has a high proportion of a non-magnetic portion, resulting in decrease in the magnetic properties. When n exceeds 7, unreacted $\alpha$-$Fe_2O_3$ increases, resulting in drastic decrease in the magnetic properties.

To have useful magnetic properties, the sintered ferrite magnet may have a composition meeting $0.31 \leq x/z \leq 21.7$, preferably $1 \leq x/z \leq 3$. The selection of a particular composition meeting $1.2 \leq x/z \leq 2$ contributes to remarkable improvement in magnetic properties.

When the condition of (amount of R element)>(amount of Co)>(amount of Ba), namely x>z>y, is met, the sintered ferrite magnet has high magnetic properties.

In the basic composition of the oxide-type, magnetic material and the sintered ferrite magnet, the mole number of oxygen is 19, when the R element content x and the Co content z meet x=z, and when the molar ratio n is 6. However, the mole number of oxygen may change depending on the valences of Fe and Co, the value of n, the type of the R element, the atmosphere for calcining or sintering. For instance, when sintering is conducted in a reducing atmosphere, the lack of oxygen (vacancy) is likely to occur. Further, Fe, which usually exists in a trivalent state in the M-type ferrite, may become bivalent, etc. The valence of Co may also change. These phenomena change the proportion of oxygen to the metal elements. Accordingly, the actual mole number of oxygen may be slightly deviated from 19.

The sintered ferrite magnet contains B in an amount of preferably 0.05-0.2% by mass, more preferably 0.08-0.15% by mass (calculated as $B_2O_3$). The above amount of B contributes to high magnetic properties. When B is less than 0.05% by mass, no effect of adding B is obtained. When B exceeds 0.2% by mass, the magnetic properties rather decrease.

$Cr_2O_3$ or $Al_2O_3$ is added in the pulverizing step in an amount of 0.1-3% by mass per the total basic composition of the sintered ferrite magnet, and molding and sintering are then conducted to obtain higher HcJ. When the amount of $Cr_2O_3$ or $Al_2O_3$ added is less than 0.1% by mass, the HcJ is not improved. When it exceeds 3% by mass, Br drastically decreases.

[2] Production Method

(A) Production of Oxide Magnet Material

The oxide-type, magnetic material (calcined body) having the above basic composition may be produced by a solid-phase reaction method, a liquid-phase method such as a coprecipitation method and a hydrothermal synthesis method, a glass precipitation method, a spray thermal decomposition method, and a vapor-phase method, alone or in combination, though the solid-phase reaction method is preferable from a practical aspect. The oxide-type, magnetic material may be produced as coarse powder of a single composition, or a blend of two or more types of coarse powder, which are produced by coarsely pulverizing calcined bodies with different calcining conditions and/or compositions, and mixing them at arbitrary ratios, as long as it has the above basic composition. For instance, mixing the calcined powder of the present invention in which n=4 with that in which n=7 can provide the sintered ferrite magnet of the present invention. Further, return scraps of green bodies or sintered bodies can be used as the oxide magnet material. Taking the solid-phase reaction for example, the production method of the calcined ferrite will be explained in detail below.

In the solid-phase reaction method, Ca compound powder, R element compound powder, Ba compound powder, iron compound powder, Co compound powder, and if necessary, Sr compound powder, which are in the form of oxides or compounds turned to oxides by calcining, are used as starting materials. These starting material powders are formulated to a predetermined ferrite composition and uniformly mixed, and the resultant mixture is calcined (ferritized) to produce a calcined body usually in the form of granules or clinker. Though the calcining is conducted practically in the air substantially having an oxygen partial pressure of about 0.05-0.2 atm, it may be conducted in an oxygen-excess atmosphere having an oxygen partial pressure of, for instance, more than 0.2 atm and 1 atm or less, particularly in a 100-% oxygen atmosphere. The heating conditions for calcining are, for instance, such that the calcining temperature is 1373-1623 K, preferably 1423-1573 K. The calcining-temperature-holding time is 1 second to 10 hours, preferably 0.1-3 hours. The resultant calcined body is preferably substantially composed of an M phase.

To obtain high magnetic properties, it is preferable to add 0.05-0.2 parts by mass of a boron compound or $SiO_2$ per 100 parts by mass of the mixture before calcining. When the amount of a boron compound or $SiO_2$ added is less than 0.05 parts by mass, no effect of adding it can be obtained. When its amount is more than 0.2 parts by mass, the magnetic properties rather decrease. The boron compound is preferably $H_3BO_3$, $B_2O_3$, metaborate $[Ca(BO_2)_2]$, etc.

As the Ca compounds, for instance, the carbonate, oxide or chloride of Ca is used.

As the R element compounds, for instance, the oxide, hydroxide, carbonate or organic acid salts of the R element are used. It is preferable to use in industrial production one or more of oxides such as $La_2O_3$, hydroxides such as $La(OH)_3$, carbonate hydrates such as $La_2(CO_3)_3.8H_2O$, organic acid salts such as $La(CH_3CO_2)_3.1.5H_2O$ and $La_2(C_2O_4)_3.10H_2O$, etc. The use of one or more of inexpensive oxides, hydroxides, carbonates and organic acid salts of mixed rare earth elements (La, Nd, Pr, Ce, etc.) can contribute to cost reduction.

As the Ba compounds, for instance, the carbonate, oxide or chloride of Ba is used.

As the iron compounds, for instance, iron oxide, iron hydroxide or iron chloride is used.

As the Co compounds, for instance, the oxide, hydroxide or carbonate of Co is used. It is preferable to use in industrial production one or more oxides such as CoO and $Co_3O_4$, hydroxides such as CoOOH, $Co(OH)_2$, $Co_3O_4.m_1H_2O$, wherein $m_1$ is a positive number, carbonates such as $CoCO_3$, basic carbonates such as $m_2CoCO_3.m_3Co(OH)_2.m_4H_2O$, wherein $m_2$, $m_3$ and $m_4$ are positive numbers, etc.

(B) Pulverization of Calcined Body

The calcined body is coarsely pulverized by a jaw crasher, a hummer mill, etc., and then charged into a coarse-pulverizing apparatus such as a vibration mill or a roller mill for dry coarse pulverization. Taking into consideration a load, etc. in a subsequent wet or dry fine pulverization, the coarsely pulverized powder preferably has an average particle size of 2-5 μm. The average diameter is measured by an air permeation method using Fischer Sub-Sieve Sizer (F.S.S.S.) as a measuring apparatus at a bulk density of 65% as a reference.

Wet fine pulverization after dry coarse pulverization is conducted by charging the coarsely pulverized powder mixed with water into a wet-fine-pulverization apparatus such as an attritor or a ball mill. To obtain industrial productivity such as dewatering characteristics and high magnetic properties, the finely pulverized powder preferably has an average diameter of 0.4-1.3 μm (measured by F.S.S.S. at a bulk density of 65% as a reference). When wet fine pulverization is conducted until fine ferrite particles have an average particle size of less than 0.4 μm, abnormal crystal grain growth occurs during sintering, resulting in decrease in HcJ, and extreme deterioration of dewatering characteristics during wet molding. When the average particle size of the fine ferrite particles exceeds 1.3 μm, the proportion of coarse crystal grains in the sintered ferrite increases, resulting in drastic decrease in HcJ. The average particle size of the finely pulverized powder is more preferably 0.7-1.3 μm, further preferably 0.8-1.3 μm, particularly 0.8-1.2 μm.

During wet fine pulverization, $SiO_2$ is added in an amount of preferably 0.1-1.5% by mass, more preferably 0.2-1.0% by mass, within the basic composition range of the sintered ferrite magnet of the present invention. The addition of $SiO_2$ stably provides high HcJ. When the amount of $SiO_2$ added is less than 0.1% by mass, no effect of adding $SiO_2$ can be obtained. When the amount of $SiO_2$ exceeds 1.5% by mass, grain growth is too much suppressed, resulting in decrease in the density (Br).

During wet fine pulverization, $CaCO_3$ is added in an amount of preferably 0.2-1.5% by mass, more preferably 0.3-1.3% by mass, within the basic composition range of the sintered ferrite magnet of the present invention. The addition of $CaCO_3$ accelerates the growth of M-type ferrite grains during sintering, resulting in improvement in the density (Br). When the amount of $CaCO_3$ added is less than 0.2% by mass, no effect of adding $CaCO_3$ can be obtained. When the amount of $CaCO_3$ exceeds 1.5% by mass, grain growth excessively proceeds during sintering, resulting in drastic decrease in HcJ.

By adding 0.05-10 parts by mass of the iron oxide per 100 parts by mass of the calcined powder during wet fine pulverization, the molar ratio n of the sintered ferrite magnet can be easily adjusted while maintaining high magnetic properties.

After wet fine pulverization, the resultant slurry is concentrated, if necessary, and then molded. Concentration may be conducted by using a centrifugal separator, a filter press, etc.

(C) Molding

The molding may be conducted in a dry or wet state. Molding under pressure without applying a magnetic field can produce green bodies for isotropic sintered ferrite magnets. Pressure-molding in a magnetic field produces a green body for an anisotropic, sintered ferrite magnet having high magnetic properties. To provide the green body with high orientation, wet molding in a magnetic field is more preferable than dry molding in a magnetic field. In the wet-molding step, slurry is molded in a magnetic field. The molding pressure is preferably about 0.1-0.5 ton/cm², and the intensity of a magnetic field applied is preferably about 398-1194 kA/m.

In the case of dry molding, for instance, the slurry is dried or heated at about 323-373 K to evaporate moisture, and then crumbled by an atomizer, etc. for use in molding. Alternatively, a green body obtained by molding the slurry in a magnetic field is pulverized by a crasher, etc., classified by a sieve to an average diameter of about 100-700 μm to produce granules oriented in a magnetic field, which is subjected to dry molding in a magnetic field. Alternatively, fine powder obtained by dry coarse pulverization and wet fine pulverization may be wet-molded with or without a magnetic field. The wet-molding pressure is about 0.1-0.5 ton/cm², and when a magnetic field is applied, its intensity is preferably about 398-1194 kA/m.

(D) Sintering

The green body is spontaneously dried in the air or heated at 373-773 K in the air or in a nitrogen atmosphere to remove moisture, the added dispersant, etc. The green body is then sintered in the air having an oxygen partial pressure of substantially about 0.05-0.2 atm in practice. Sintering may be conducted in an oxygen-excess atmosphere having an oxygen partial pressure of, for instance, more than 0.2 atm and 1 atm or less, particularly in a 100-% oxygen atmosphere. Heating conditions for sintering are, for instance, a temperature of 1423-1573 K, preferably 1433-1543 K, for 0.5-5 hours, preferably about 1-3 hours. The sintered ferrite magnet of the present invention has a density of about 5.05-5.10 g/cm³.

[3] Properties of Sintered Ferrite Magnet

The anisotropic, sintered ferrite magnet of the present invention has an average crystal grain size of 0.5-3 μm or less, preferably 0.9-2 μm, more preferably 1-1.6 μm, when 50 M-type crystal grains were measured in a c-axis direction by a scanning electron microscope (SEM) on a cross section in parallel to the c-axis. Even if the average crystal grain size exceeds 1 μm, high Hcj can be obtained in the present invention. The c-axis direction of the sintered ferrite magnet of the present invention is in alignment with an anisotropy direction, which is substantially identical to the direction of a magnetic field applied in a magnetic-field molding.

When the proportion of M-type crystal grains having an aspect ratio (particle size/thickness) of 3 or less is 30% or more, preferably 50% or more, more preferably 60% or more among those contained in the sintered ferrite magnet of the present invention, the sintered ferrite magnet has high Brand high HcJ.

The sintered ferrite magnet of the present invention obtained by sintering in the air has Br of 400-470 mT, HcJ of 278-478 kA/m, and a squareness ratio (Hk/HcJ) of 80% or more at room temperature (20° C.). preferably, it has Br of 420-470 mT, HcJ of 278-478 kA/m and a squareness ratio (Hk/HcJ) of 80% or more. Particularly, it may have Br of 450-470 mT, HcJ of 278-478 kA/m and a squareness ratio (Hk/HcJ) of 80% or more. A parameter Hk measured to obtain (Hk/HcJ) is a value on an H-axis at a position at which $4\pi I$ is 0.95 Br, in the second quadrant of a graph showing a curve of $4\pi I$ (intensity of magnetization) to H (intensity of magnetic field). Hk/HcJ obtained by dividing Hk by HcJ of a demagnetization curve represents a so-called squareness ratio.

The oxide-type, magnetic materials and sintered ferrite magnets of the present invention are useful for various rotors (motors, generators, etc.) in starters, power-steering systems, electrically controlled throttles, etc. for automobiles. They are also useful for magnet rolls in developing rolls in copiers.

The present invention will be described in detail referring to Examples below without intention of restricting the scope of the present invention thereto.

Example 1

Prior-Addition of Ba $CaCO_3$ powder (purity: 98.8%, containing MgO as impurities), $La(OH)_3$ powder (purity: 99.9%), $BaCO_3$ powder (purity: 98.1%, containing 1.45% of $SrCO_3$ as impurities), $\alpha$-$Fe_2O_3$ powder, and $Co_3O_4$ powder were formulated to two calcined body compositions with different y, which are represented by $Ca_{1-x-y}La_xBa_yFe_{2n-z}Co_zO_{19}$, wherein x=0.495, y=0.005 and 0.010, z=0.30, and n=5.2. 0.1 parts by mass of $H_3BO_3$ powder was added to 100 parts by mass of formulation, and wet-mixed. After drying the resultant mixture, calcining was conducted at 1473 K for 1 hour in the air. The resultant samples are named as Example 1-1 when y=0.005, and Example 1-2 when y=0.01. The resultant calcined body was coarsely pulverized, and then subjected to dry coarse pulverization in a vibration mill to obtain coarse powder having an average particle size of 5 μm (by F.S.S.S.). 45% by mass of the coarse powder and 55% by mass of water were charged into a ball mill, and 0.40 parts by mass of $SiO_2$ powder (purity: 92.1%, balance: substantially water) and 0.50 parts by mass of $CaCO_3$ powder were added as sintering aids to 100 parts by mass of the coarse powder. Wet fine pulverization was conducted to obtain a slurry containing fine ferrite particles having an average particle size of 0.85 μm (by F.S.S.S.).

The slurry after fine pulverization was compression-molded in a parallel magnetic field of 796 kA/m under a molding pressure of 0.4 ton/cm². The densities of the resultant disk-shaped green bodies of 40 mm in outer diameter and 15 mm in thickness, which were determined from their measured mass and size, are shown in Table 1. The green bodies were sintered at temperatures of 1473K, 1483K and 1493K, respectively, for 1 hour in the air.

Figure 1B:
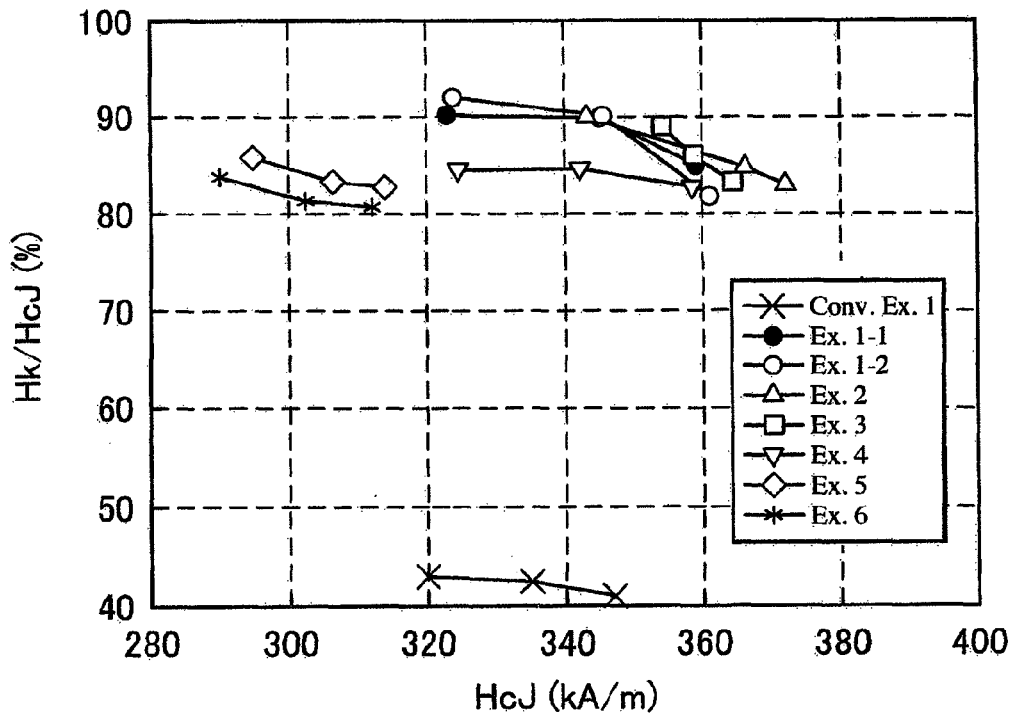
FIG. 1(b) is a graph showing the magnetic properties of the sintered ferrite magnets of Examples 1-6 and Conventional Example 1, in which three points in each case indicate experimental results obtained on the same composition at different sintering temperatures of 1473K, 1483K and 1493K from the right.

The resultant sintered bodies were machined and measured with respect to magnetic properties at room temperature (20° C.) by a B-H tracer. The measurement results are shown in FIGS. 1(a) and 1(b). Table 2 shows the analyzed compositions of the sintered bodies. Table 3 shows the analyzed values of the sintered bodies when the total amount of constituent elements excluding oxygen is 100 atomic %.

TABLE 1

| No. | Composition of Calcined Body | | | | Average Particle Size[1] (μm) | Density of Green Body (g/cm³) |
|---|---|---|---|---|---|---|
| | x | y | z | n | | |
| Conventional Example 1 | 0.500 | 0 | 0.43 | 5.1 | 0.85 | 2.71 |
| Example 1-1 | 0.495 | 0.005 | 0.30 | 5.2 | 0.85 | 2.74 |
| Example 1-2 | 0.495 | 0.010 | 0.30 | 5.2 | 0.85 | 2.75 |
| Example 2 | 0.488 | 0.025 | 0.30 | 5.2 | 0.85 | 2.82 |
| Example 3 | 0.475 | 0.050 | 0.30 | 5.2 | 0.86 | 2.87 |
| Example 4 | 0.445 | 0.100 | 0.30 | 5.2 | 0.85 | 2.78 |

TABLE 1-continued

| No. | Composition of Calcined Body | | | | Average Particle Size[1] (μm) | Density of Green Body (g/cm³) |
| --- | --- | --- | --- | --- | --- | --- |
| | x | y | z | n | | |
| Example 5 | 0.425 | 0.150 | 0.30 | 5.2 | 0.86 | 2.77 |
| Example 6 | 0.400 | 0.200 | 0.30 | 5.2 | 0.85 | 2.77 |

Note:
[1]The average particle size of fine ferrite particles.

Examples 2-6

Investigation of Amount of Ba Prior-Added

Calcined bodies were produced in the same manner as in Example 1 except for using each calcined body composition shown in Table 1. With the subsequent steps conducted in the same manner as in Example 1, anisotropic, sintered ferrite magnets of Examples 2-6 were produced. Wet fine pulverization was conducted to provide fine ferrite particles having an average particle size of 0.85 μm (by F.S.S.S.). The results are shown in FIGS. 1(a) and 1(b). Table 1 shows the measured density of a disk-shaped green body in each Example. Tables 2 and 3 show the analyzed values of the sintered bodies.

Conventional Example 1

Addition of no Ba

Sample No. 2 in Japanese Patent 3181559 was traced. A mixture having a basic composition represented by $Ca_{1-x-y}La_xBa_yFe_{2n-z}Co_zO_{19}$, wherein x=0.500, y=0, z=0.43, and n=5.1, to which 0.4% by mass of $SiO_2$ was added, was calcined at 1473K for 3 hours in the air. The resultant calcined body was coarsely pulverized, mixed with 0.6% by mass of $SiO_2$ and 1.0% by mass of $CaCO_3$, and then subjected to wet fine pulverization using water as a medium with a ball mill, to provide a slurry containing fine powder having an average particle size of 0.85 μm. Because Japanese Patent 3181559 does not describe the average particle size of the fine powder of Sample No. 2, the average particle size (0.85 μm) of the finely pulverized powder of Example 1 was used. Subsequently in the same manner as in Example 1, the slurry was molded in a magnetic field and sintered to produce an anisotropic, sintered ferrite magnet. The measurement results are shown in FIGS. 1(a) and 1(b). Table 1 shows the density of a disk-shaped green body, and Tables 2 and 3 show the analyzed values of the sintered body.

TABLE 2

| Sample No. | Composition of Sintered Body: $Ca_{1-x-y}La_xBa_yFe_{2n-z}Co_zO_{19}$ | | | | | |
| --- | --- | --- | --- | --- | --- | --- |
| | Molar Ratio n | Ca 1-x-y | La x | Ba y | Fe 2n-z | Co z |
| Example 1-1 | 4.958 | 0.521 | 0.474 | 0.005 | 9.631 | 0.286 |
| Example 1-2 | 4.958 | 0.518 | 0.472 | 0.010 | 9.631 | 0.286 |
| Example 2 | 4.958 | 0.511 | 0.465 | 0.024 | 9.630 | 0.286 |
| Example 3 | 4.958 | 0.499 | 0.453 | 0.048 | 9.630 | 0.286 |
| Example 4 | 4.957 | 0.476 | 0.429 | 0.095 | 9.629 | 0.286 |
| Example 5 | 4.957 | 0.452 | 0.405 | 0.143 | 9.628 | 0.286 |
| Example 6 | 4.956 | 0.428 | 0.381 | 0.191 | 9.626 | 0.286 |
| Conventional Example 1 | 4.652 | 0.544 | 0.456 | 0.000 | 8.911 | 0.392 |
| Example 7 | 5.051 | 0.512 | 0.465 | 0.024 | 9.816 | 0.286 |
| Example 8 | 5.143 | 0.512 | 0.464 | 0.024 | 10.001 | 0.286 |
| Example 9 | 5.051 | 0.500 | 0.453 | 0.048 | 9.815 | 0.286 |
| Example 10 | 5.143 | 0.500 | 0.452 | 0.048 | 10.000 | 0.286 |
| Example 11 | 4.935 | 0.514 | 0.463 | 0.024 | 9.586 | 0.285 |
| Example 12 | 4.958 | 0.511 | 0.465 | 0.024 | 9.630 | 0.286 |
| Example 13 | 4.981 | 0.509 | 0.467 | 0.024 | 9.675 | 0.287 |
| Example 14 | 5.005 | 0.507 | 0.469 | 0.024 | 9.721 | 0.289 |
| Example 15 | 4.958 | 0.511 | 0.465 | 0.024 | 9.630 | 0.286 |
| Example 16 | 4.981 | 0.509 | 0.467 | 0.024 | 9.675 | 0.287 |
| Example 17 | 5.005 | 0.507 | 0.469 | 0.024 | 9.721 | 0.289 |
| Example 18 | 5.028 | 0.504 | 0.471 | 0.024 | 9.767 | 0.290 |
| Example 19 | 5.027 | 0.502 | 0.451 | 0.047 | 9.769 | 0.285 |
| Example 20 | 5.051 | 0.500 | 0.453 | 0.048 | 9.815 | 0.286 |
| Example 21 | 5.074 | 0.497 | 0.455 | 0.048 | 9.862 | 0.287 |
| Example 22 | 5.099 | 0.495 | 0.457 | 0.048 | 9.908 | 0.289 |
| Example 23 | 5.051 | 0.500 | 0.453 | 0.048 | 9.815 | 0.286 |
| Example 24 | 5.074 | 0.497 | 0.455 | 0.048 | 9.862 | 0.287 |
| Example 25 | 5.099 | 0.495 | 0.457 | 0.048 | 9.908 | 0.289 |
| Example 26 | 5.123 | 0.493 | 0.459 | 0.048 | 9.956 | 0.290 |
| Comparative Example 1 | 5.051 | 0.500 | 0.453 | 0.048 | 10.102 | 0.000 |
| Example 27-1 | 5.051 | 0.500 | 0.453 | 0.048 | 10.073 | 0.029 |
| Example 27-2 | 5.051 | 0.500 | 0.453 | 0.048 | 10.006 | 0.095 |
| Example 27-3 | 5.051 | 0.500 | 0.453 | 0.048 | 9.911 | 0.191 |
| Example 27-4 | 5.051 | 0.500 | 0.453 | 0.048 | 9.815 | 0.286 |
| Example 27-5 | 5.050 | 0.500 | 0.453 | 0.048 | 9.720 | 0.381 |
| Example 27-6 | 5.050 | 0.500 | 0.453 | 0.048 | 9.624 | 0.476 |
| Example 27-7 | 5.050 | 0.500 | 0.453 | 0.048 | 9.529 | 0.572 |
| Example 27-8 | 5.050 | 0.500 | 0.453 | 0.048 | 9.481 | 0.619 |
| Comparative Example 2-1 | 5.050 | 0.500 | 0.453 | 0.048 | 9.433 | 0.667 |
| Comparative Example 2-2 | 5.050 | 0.500 | 0.453 | 0.048 | 9.338 | 0.762 |
| Example 28 | 5.051 | 0.500 | 0.453 | 0.048 | 9.815 | 0.286 |

TABLE 3

| Sample No. | Analyzed Composition of Sintered Body (atomic %) | | | | | |
| --- | --- | --- | --- | --- | --- | --- |
| | Ca | La | Ba | Sr | Fe | Co |
| Example 1-1 | 4.629 | 4.316 | 0.043 | 0.001 | 87.086 | 2.602 |
| Example 1-2 | 4.608 | 4.295 | 0.085 | 0.002 | 87.085 | 2.602 |
| Example 2 | 4.545 | 4.230 | 0.213 | 0.004 | 87.085 | 2.602 |
| Example 3 | 4.440 | 4.121 | 0.425 | 0.008 | 87.084 | 2.602 |
| Example 4 | 4.230 | 3.904 | 0.850 | 0.017 | 87.082 | 2.602 |
| Example 5 | 4.020 | 3.687 | 1.275 | 0.025 | 87.080 | 2.602 |
| Example 6 | 3.811 | 3.470 | 1.700 | 0.033 | 87.078 | 2.602 |
| Conventional Example 1 | 5.085 | 4.367 | 0.000 | 0.000 | 84.804 | 3.755 |
| Example 7 | 4.472 | 4.157 | 0.209 | 0.004 | 87.285 | 2.557 |
| Example 8 | 4.401 | 4.087 | 0.205 | 0.004 | 87.479 | 2.514 |
| Example 9 | 4.369 | 4.050 | 0.418 | 0.008 | 87.284 | 2.557 |
| Example 10 | 4.300 | 3.982 | 0.411 | 0.008 | 87.478 | 2.514 |
| Example 11 | 4.584 | 4.228 | 0.212 | 0.004 | 87.047 | 2.601 |
| Example 12 | 4.545 | 4.230 | 0.213 | 0.004 | 87.085 | 2.602 |
| Example 13 | 4.506 | 4.231 | 0.213 | 0.004 | 87.123 | 2.603 |
| Example 14 | 4.466 | 4.233 | 0.213 | 0.004 | 87.161 | 2.604 |
| Example 15 | 4.548 | 4.232 | 0.213 | 0.004 | 87.142 | 2.604 |
| Example 16 | 4.509 | 4.234 | 0.213 | 0.004 | 87.181 | 2.605 |
| Example 17 | 4.469 | 4.236 | 0.213 | 0.004 | 87.219 | 2.606 |
| Example 18 | 4.430 | 4.238 | 0.213 | 0.004 | 87.257 | 2.607 |

| Sample No. | Analyzed Composition of Sintered Body (atomic %) | | | | | | |
| --- | --- | --- | --- | --- | --- | --- | --- |
| | Si | B | Cr | Al | Mn | Ni | Mg |
| Example 1-1 | 0.546 | 0.142 | 0.018 | 0.089 | 0.412 | 0.001 | 0.117 |
| Example 1-2 | 0.546 | 0.142 | 0.018 | 0.089 | 0.412 | 0.001 | 0.117 |
| Example 2 | 0.546 | 0.142 | 0.018 | 0.089 | 0.412 | 0.001 | 0.115 |
| Example 3 | 0.546 | 0.142 | 0.018 | 0.089 | 0.412 | 0.001 | 0.112 |
| Example 4 | 0.547 | 0.142 | 0.018 | 0.089 | 0.412 | 0.001 | 0.107 |

TABLE 3-continued

| | | | | | | | |
|---|---|---|---|---|---|---|---|
| Example 5 | 0.548 | 0.142 | 0.018 | 0.089 | 0.412 | 0.001 | 0.102 |
| Example 6 | 0.549 | 0.142 | 0.018 | 0.089 | 0.412 | 0.001 | 0.096 |
| Conventional Example 1 | 1.354 | 0.000 | 0.017 | 0.087 | 0.401 | 0.001 | 0.129 |
| Example 7 | 0.543 | 0.140 | 0.018 | 0.089 | 0.413 | 0.001 | 0.113 |
| Example 8 | 0.540 | 0.137 | 0.018 | 0.090 | 0.414 | 0.001 | 0.111 |
| Example 9 | 0.543 | 0.140 | 0.018 | 0.089 | 0.413 | 0.001 | 0.110 |
| Example 10 | 0.540 | 0.137 | 0.018 | 0.090 | 0.414 | 0.001 | 0.109 |
| Example 11 | 0.547 | 0.143 | 0.018 | 0.089 | 0.412 | 0.001 | 0.116 |
| Example 12 | 0.546 | 0.142 | 0.018 | 0.089 | 0.412 | 0.001 | 0.115 |
| Example 13 | 0.545 | 0.141 | 0.018 | 0.089 | 0.412 | 0.001 | 0.114 |
| Example 14 | 0.544 | 0.141 | 0.018 | 0.089 | 0.412 | 0.001 | 0.113 |
| Example 15 | 0.480 | 0.142 | 0.018 | 0.089 | 0.412 | 0.001 | 0.115 |
| Example 16 | 0.480 | 0.141 | 0.018 | 0.089 | 0.412 | 0.001 | 0.114 |
| Example 17 | 0.479 | 0.141 | 0.018 | 0.089 | 0.413 | 0.001 | 0.113 |
| Example 18 | 0.478 | 0.140 | 0.018 | 0.089 | 0.413 | 0.001 | 0.112 |

Analyzed Composition of Sintered Body (atomic %)

| Sample No. | Ca | La | Ba | Sr | Fe | Co |
|---|---|---|---|---|---|---|
| Example 19 | 4.408 | 4.049 | 0.418 | 0.008 | 87.246 | 2.556 |
| Example 20 | 4.369 | 4.050 | 0.418 | 0.008 | 87.284 | 2.557 |
| Example 21 | 4.330 | 4.052 | 0.418 | 0.008 | 87.322 | 2.558 |
| Example 22 | 4.290 | 4.054 | 0.418 | 0.008 | 87.360 | 2.560 |
| Example 23 | 4.372 | 4.053 | 0.418 | 0.008 | 87.342 | 2.559 |
| Example 24 | 4.332 | 4.055 | 0.418 | 0.008 | 87.380 | 2.560 |
| Example 25 | 4.293 | 4.057 | 0.418 | 0.008 | 87.418 | 2.561 |
| Example 26 | 4.254 | 4.058 | 0.419 | 0.008 | 87.456 | 2.562 |
| Comparative Example 1 | 4.369 | 4.050 | 0.418 | 0.008 | 89.827 | 0.000 |
| Example 27-1 | 4.369 | 4.050 | 0.418 | 0.008 | 89.573 | 0.256 |
| Example 27-2 | 4.369 | 4.050 | 0.418 | 0.008 | 88.980 | 0.852 |
| Example 27-3 | 4.369 | 4.050 | 0.418 | 0.008 | 88.132 | 1.705 |
| Example 27-4 | 4.369 | 4.050 | 0.418 | 0.008 | 87.284 | 2.557 |
| Example 27-5 | 4.369 | 4.050 | 0.418 | 0.008 | 86.436 | 3.410 |
| Example 27-6 | 4.369 | 4.050 | 0.418 | 0.008 | 85.589 | 4.262 |
| Example 27-7 | 4.368 | 4.050 | 0.418 | 0.008 | 84.741 | 5.115 |
| Example 27-8 | 4.368 | 4.050 | 0.418 | 0.008 | 84.317 | 5.541 |
| Comparative Example 2-1 | 4.368 | 4.050 | 0.418 | 0.008 | 83.893 | 5.967 |
| Comparative Example 2-2 | 4.368 | 4.050 | 0.418 | 0.008 | 83.046 | 6.819 |
| Example 28 | 4.369 | 4.050 | 0.418 | 0.008 | 87.284 | 2.557 |

Analyzed Composition of Sintered Body (atomic %)

| Sample No. | Si | B | Cr | Al | Mn | Ni | Mg |
|---|---|---|---|---|---|---|---|
| Example 19 | 0.544 | 0.140 | 0.018 | 0.089 | 0.413 | 0.001 | 0.111 |
| Example 20 | 0.543 | 0.140 | 0.018 | 0.089 | 0.413 | 0.001 | 0.110 |
| Example 21 | 0.542 | 0.139 | 0.018 | 0.089 | 0.413 | 0.001 | 0.109 |
| Example 22 | 0.542 | 0.138 | 0.018 | 0.089 | 0.413 | 0.001 | 0.108 |
| Example 23 | 0.478 | 0.140 | 0.018 | 0.089 | 0.413 | 0.001 | 0.111 |
| Example 24 | 0.477 | 0.139 | 0.018 | 0.090 | 0.413 | 0.001 | 0.110 |
| Example 25 | 0.476 | 0.138 | 0.018 | 0.090 | 0.414 | 0.001 | 0.109 |
| Example 26 | 0.476 | 0.138 | 0.018 | 0.090 | 0.414 | 0.001 | 0.108 |
| Comparative Example 1 | 0.543 | 0.140 | 0.018 | 0.092 | 0.425 | 0.000 | 0.110 |
| Example 27-1 | 0.543 | 0.140 | 0.018 | 0.091 | 0.424 | 0.000 | 0.110 |
| Example 27-2 | 0.543 | 0.140 | 0.018 | 0.091 | 0.421 | 0.000 | 0.110 |
| Example 27-3 | 0.543 | 0.140 | 0.018 | 0.090 | 0.417 | 0.000 | 0.110 |
| Example 27-4 | 0.543 | 0.140 | 0.018 | 0.089 | 0.413 | 0.001 | 0.110 |
| Example 27-5 | 0.543 | 0.140 | 0.017 | 0.089 | 0.409 | 0.001 | 0.110 |
| Example 27-6 | 0.543 | 0.140 | 0.017 | 0.088 | 0.405 | 0.001 | 0.110 |
| Example 27-7 | 0.543 | 0.140 | 0.017 | 0.087 | 0.401 | 0.001 | 0.110 |
| Example 27-8 | 0.543 | 0.140 | 0.017 | 0.087 | 0.399 | 0.001 | 0.110 |
| Comparative Example 2-1 | 0.543 | 0.140 | 0.017 | 0.086 | 0.397 | 0.001 | 0.110 |
| Comparative Example 2-2 | 0.543 | 0.140 | 0.017 | 0.086 | 0.393 | 0.001 | 0.110 |
| Example 28 | 0.543 | 0.140 | 0.018 | 0.089 | 0.413 | 0.001 | 0.110 |

It is clear from FIGS. 1(a) and 1(b) that the sintered ferrite magnets of Examples 1-1, 1-2 and 2 to 6, in which a predetermined amount of Ba was prior-added, had much higher magnetic properties than those of the sintered ferrite magnet of Conventional Example 1. Particularly, the sintered product of Example 3 obtained at 1493K had Br of 460 mT, which could not be achieved by a conventional SrM. It is clear from Table 1 that the green bodies of Examples 1-1, 1-2 and 2 to 6 had higher densities than that of Conventional Example 1.

The examination of cracks in 100 green bodies in each example revealed that no cracks were observed in the green bodies of Examples 1-1, 1-2 and 2 to 6, while the green body of Conventional Example 1 had several cracks.

Structure of Calcined Body

Figure 2:
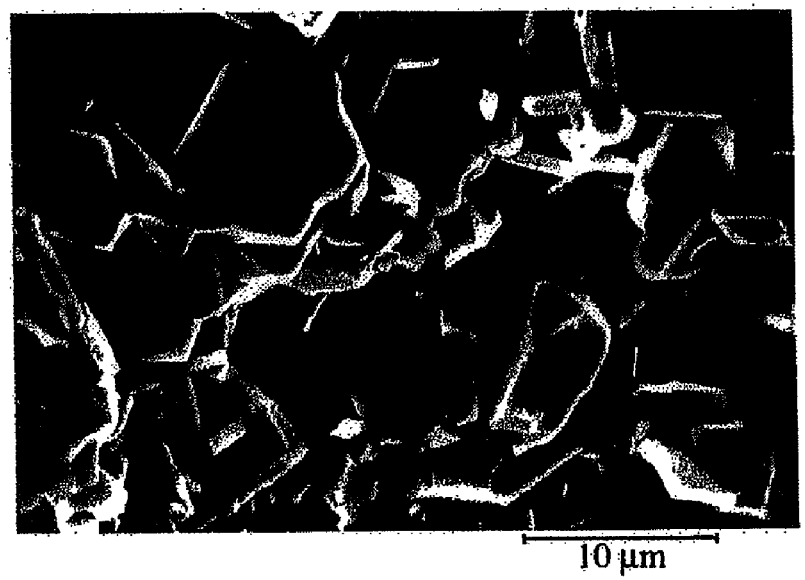
FIG. 2 is a SEM photograph showing a fractured surface of the calcined body of the present invention (Example 3).

FIG. 2 is a SEM photograph of a fracture surface of the calcined body of Example 3, wherein x=0.475, y=0.050, z=0.30, and n=5.2. Many primary particles (M-type crystal grains) in the calcined body were in a hexagonal plate shape, indicating a high growing rate of M-type crystal grains. This SEM photograph indicates that the calcined body had the maximum diameter of about 3-9 μm in a c-plane, a thickness of about 1.3-4.3 μm, an aspect ratio (maximum diameter/thickness) of about 1.5-4.2.

Figure 3:
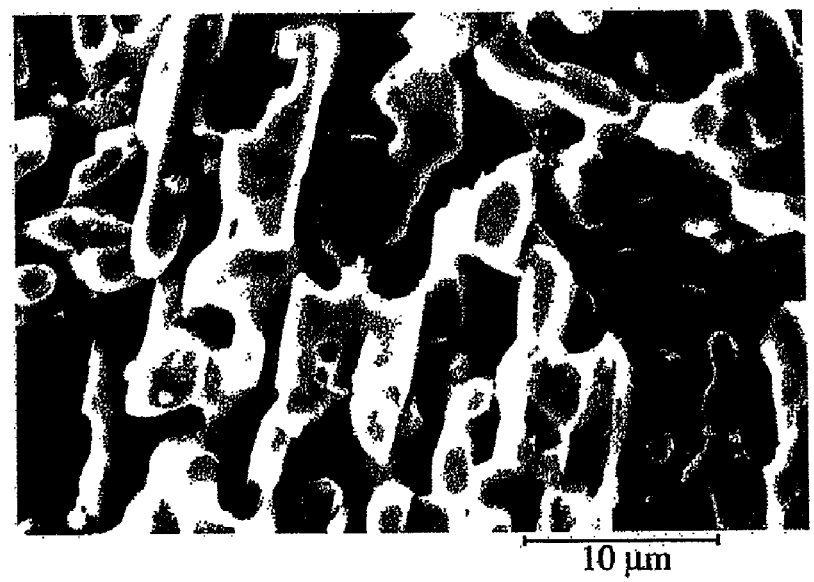
FIG. 3 is a SEM photograph showing a fractured surface of the calcined body of Conventional Example 1.

FIG. 3 is a SEM photograph of a fractured surface of the calcined body of Conventional Example 1, wherein x=0.500, y=0, z=0.43, and n=5.1. The calcined body had primary particles in irregular shapes, not in a hexagonal plate shape.

The comparison of FIGS. 2 and 3 indicates that the calcined body of the present invention (Example 3), to which a predetermined amount of Ba was added, had primary particles in a thick, hexagonal-planar, particle shape. Also, those having an aspect ratio of 5 or less were about 60% of the primary particles.

Structure of Finely Pulverized Powder

Figure 4:
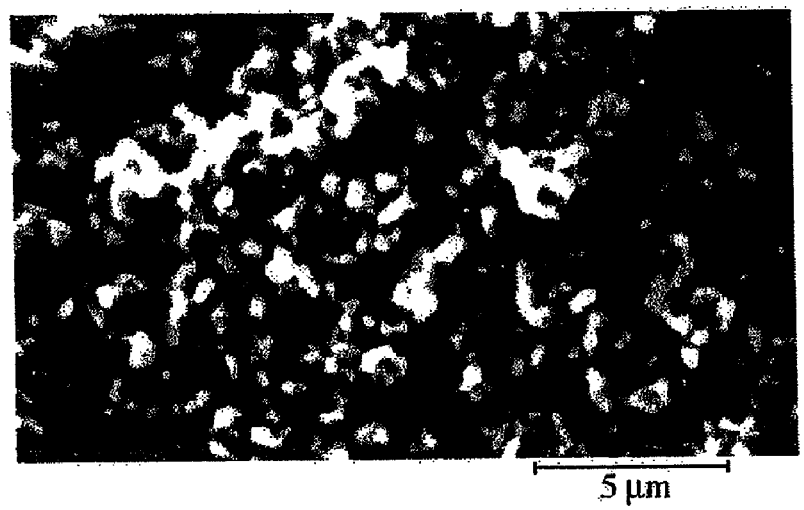
FIG. 4 is a SEM photograph showing powder obtained by finely pulverizing the calcined body of the present invention (Example 3).

FIG. 4 is a SEM photograph showing fine powder having an average particle size of 0.85 μm, which was obtained by finely pulverizing the calcined body of Example 3, wherein x=0.475, y=0.050, z=0.30, and n=5.2, and drying the resultant slurry. It was observed that there were many particles in a hexagonal plate shape. While there were few ultra-fine particles having the maximum diameter of less than 0.4 μm and few coarse particles having the maximum diameter of more than 1.2 μm, many particles having the maximum diameter of 0.4-1.2 μm were observed.

Figure 5:
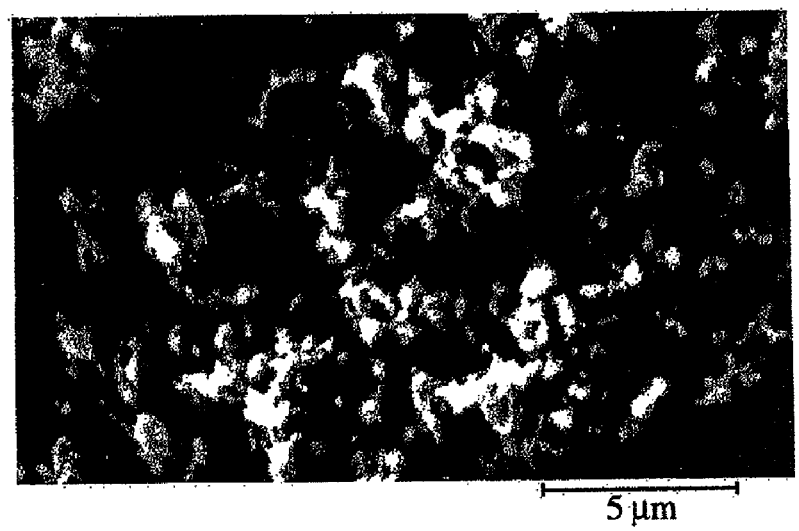
FIG. 5 is a SEM photograph showing powder obtained by finely pulverizing the calcined body of Conventional Example 1.

FIG. 5 is a SEM photograph showing fine powder having an average particle size of 0.85 μm, which was obtained by finely pulverizing the calcined body of Conventional Example 1, wherein x=0.500, y=0, z=0.43, and n=5.1, and drying the resultant slurry. Many irregular-shaped, ultra-fine particles having the maximum diameter 0.2 μm or less and many irregular-shaped, coarse particles having the maximum diameter of 1.5 μm or more were observed.

It is clear from FIGS. 4 and 5 that the density difference shown in Table 1 between the green bodies of Example 3 and Conventional Example 1 was derived from their difference in powder characteristics.

Structure of Sintered Body

Figure 6:
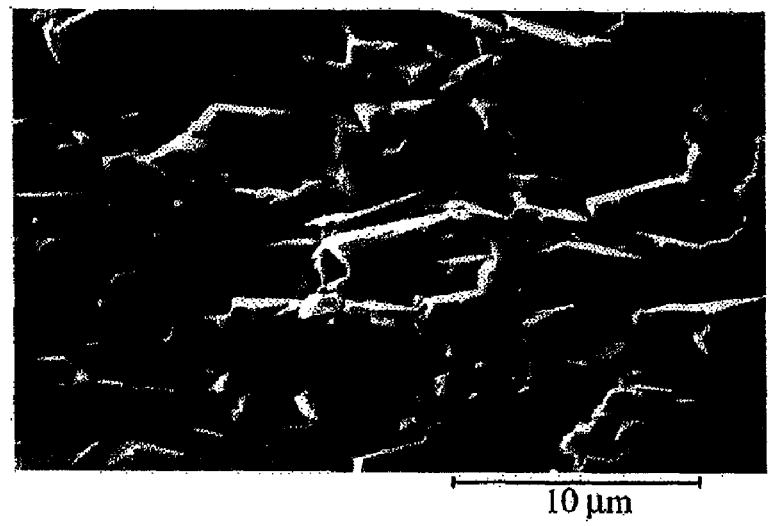
FIG. 6 is a SEM photograph showing a fractured surface of the sintered ferrite magnet of the present invention (Example 3).

FIG. 6 is a SEM photograph showing a fractured surface (a-plane) of the sintered body (x=0.429, y=0.095, z=0.286, and n=4.957) of Example 3 obtained by sintering at 1493K in the air. Hexagonal, planar particles, M-type crystal grains, had an aspect ratio of about 1.5-3.5. Each particle was thick and had an average crystal grain size of 1.1 μm in a c-axis direction, about 60% of the particles having an aspect ratio of 3 or less.

Figure 7:
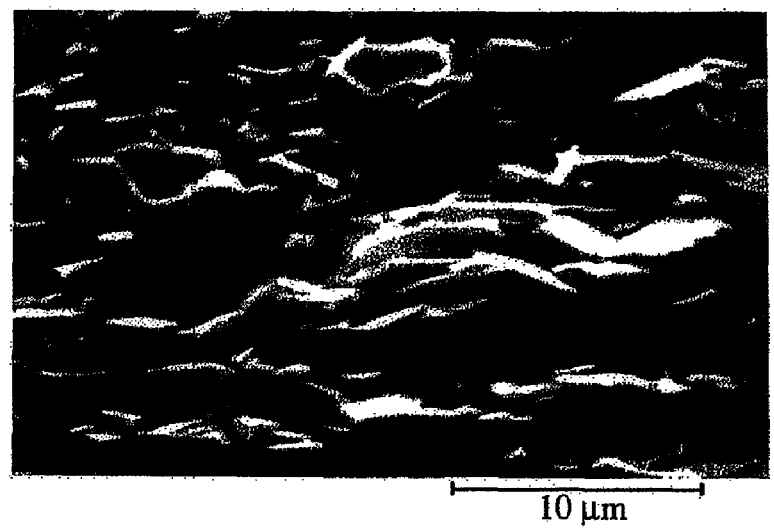
FIG. 7 is a SEM photograph showing a fractured surface of the sintered ferrite magnet of Conventional Example 1.

FIG. 7 is a SEM photograph showing a fractured surface of the sintered body (x=0.456, y=0, z=0.392, and n=4.652) of Conventional Example 1 obtained by sintering at 1493K in the air. Observation revealed that there were many particles having an aspect ratio of about 3-6.

Examples 7 and 8

Investigate 1 of Prior-Addition of Ba and Molar Ratio n

Figure 8A:
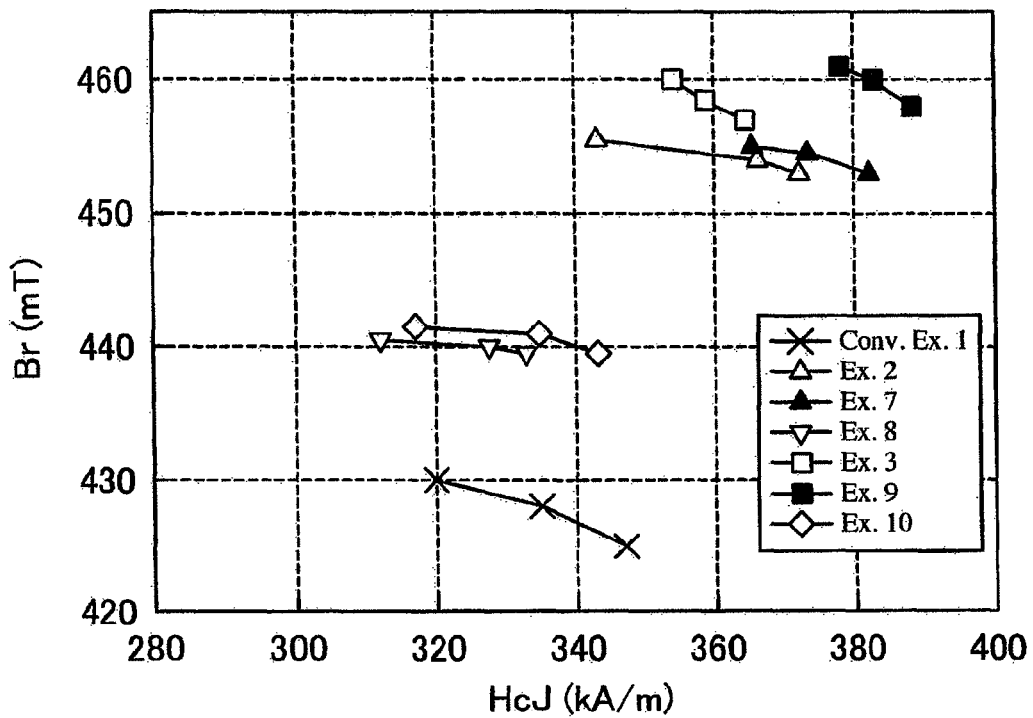
FIG. 8(a) is a graph showing the magnetic properties of the sintered ferrite magnets of Examples 2, 3, 7-10 and Conventional Example 1, in which three points in each case indicate experimental results obtained on the same composition at different sintering temperatures of 1473K, 1483K and 1493K from the right.
Figure 8B:
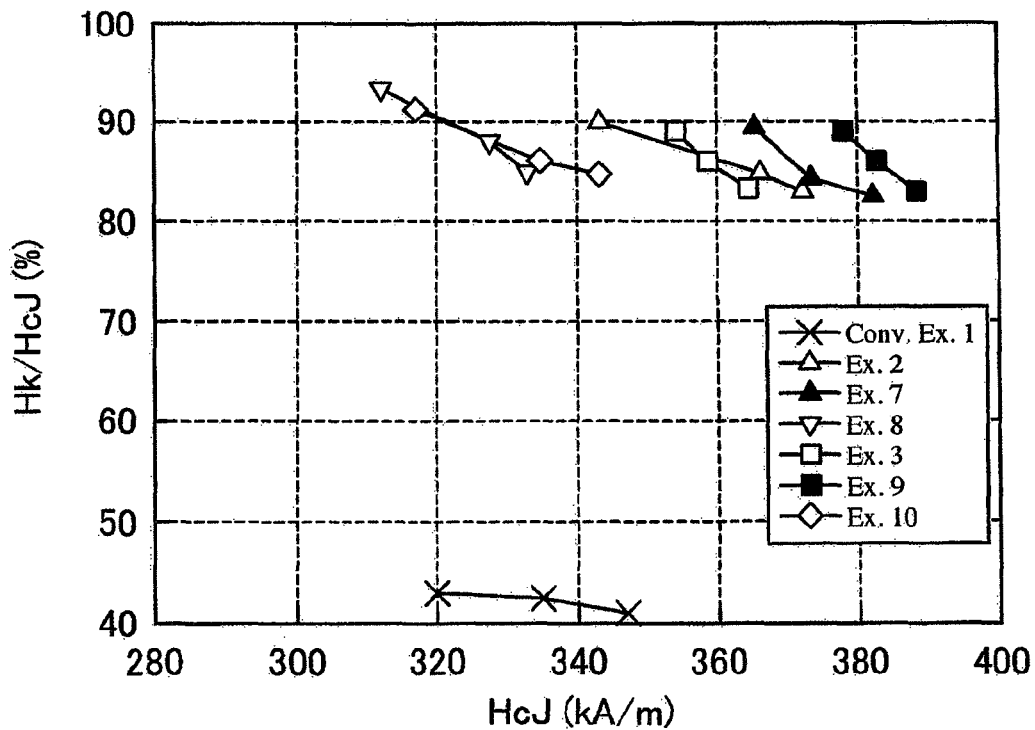
FIG. 8(b) is a graph showing the magnetic properties of the sintered ferrite magnets of Examples 2, 3, 7-10 and Conventional Example 1, in which three points in each case indicate experimental results obtained on the same composition at different sintering temperatures of 1473K, 1483K and 1493K from the right.

Calcining, pulverization, molding in a magnetic field, sintering, machining, and the measurement of magnetic properties were conducted in the same manner as in Example 2, except for using the calcined body composition of $Ca_{1-x-y}La_xBa_yFe_{2n-z}Co_zO_{19}$, wherein x=0.488, y=0.025, z=0.30, and n=5.3 and 5.4. n was 5.3 in Example 7 and 5.4 in Example 8. The average particle size of finely pulverized powder was 0.85 μm as in Example 1. FIGS. 8(a) and 8(b) show their magnetic properties. Tables 2 and 3 show the analyzed values of sintered bodies. It is clear from FIGS. 8(a) and 8(b) that the magnetic properties were highest when n was 5.3.

Examples 9 and 10

Investigate 2 of Prior-Addition of Ba and Molar Ratio n

Calcining, pulverization, molding in a magnetic field, sintering, machining, and the measurement of magnetic properties were conducted in the same manner as in Example 3, except for using the calcined body composition of $Ca_{1-x-y}La_xBa_yFe_{2n-z}Co_zO_{19}$, wherein x=0.475, y=0.050, z=0.30, and n=5.3 and 5.4. n was 5.3 in Example 9 and 5.4 in Example 10. The average particle size of finely pulverized powder was 0.85 μm as in Example 1. FIGS. 8(a) and 8(b) show their magnetic properties. Tables 2 and 3 show the analyzed values of sintered bodies. It is clear from FIGS. 8(a) and 8(b) that the magnetic properties were highest in Example 9, exceeding 460 mT. Extremely high Br was obtained, which could not be achieved in conventional SrM.

Examples 11-18

Investigate 1 of Prior-Addition of Ba, and Amount of CaCO₃ Added when Pulverizing SiO₂

Figure 9A:
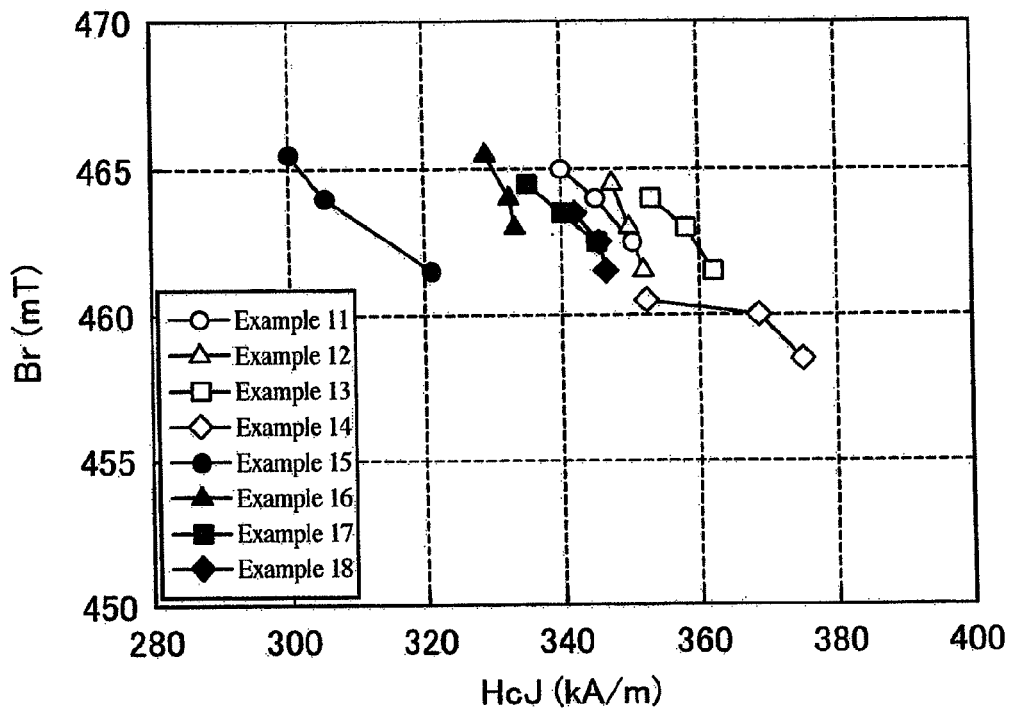
FIG. 9(a) is a graph showing the magnetic properties of the sintered ferrite magnets of Examples 11-18, in which three points in each case indicate experimental results obtained on the same composition at different sintering temperatures of 1473K, 1483K and 1493K from the right.
Figure 9B:
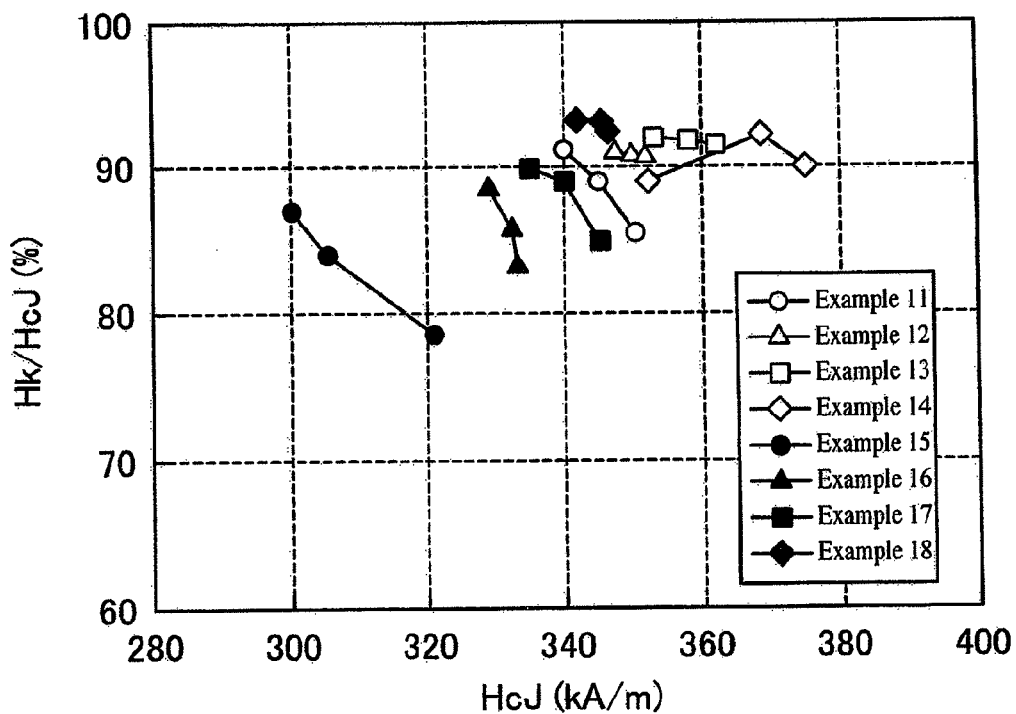
FIG. 9(b) is a graph showing the magnetic properties of the sintered ferrite magnets of Examples 11-18, in which three points in each case indicate experimental results obtained on the same composition at different sintering temperatures of 1473K, 1483K and 1493K from the right.

Using $CaCO_3$ powder, $La(OH)_3$ powder, $BaCO_3$ powder, $α-Fe_2O_3$ powder and $Co_3O_4$ powder as in Example 1, a composition of $Ca_{1-x-y}La_xBa_yFe_{2n-z}Co_zO_{19}$, wherein x=0.488, y=0.025, z=0.3, and n=5.2, was formulated. 0.1 parts by mass of $H_3BO_3$ powder was added to 100 parts by mass of the mixture and wet-mixed. The mixture was calcined at 1473 K for 1 hour in the air. The resultant calcined body was coarsely pulverized, and subjected to dry coarse pulverization with a vibration mill to obtain coarse powder having an average particle size of 5 μm (by F.S.S.S.). 0.40 parts by mass of $SiO_2$ powder and 0.55 parts by mass of $CaCO_3$ powder, per 100 parts by mass of coarse calcined powder, were added to 45% by mass of coarse powder and 55% by mass of water, and wet fine pulverization was conducted with a ball mill to provide the slurry of Example 11 containing fine ferrite particles having an average particle size of 0.81 μm (by F.S.S.S.). Further, the slurries of Examples 12-18 were produced in the same manner as in Example 11 except for using the compositions of $SiO_2$ and $CaCO_3$ shown in Table 4. The resultant eight types of slurries were formed into anisotropic, sintered ferrite magnets in the same manner as in Example 1 in the magnetic-field molding step et seq., and their magnetic properties were measured. FIGS. 9(a) and 9(b) show their magnetic properties. Tables 2 and 3 show the analyzed values of the sintered bodies. As is clear from FIGS. 9(a) and 9(b), anisotropic, sintered ferrite magnets having Br exceeding 460 mT were obtained in any of Examples 11-18, meaning that as high Br as not achieved by conventional SrM was obtained.

TABLE 4

| No. | SiO₂ (% by mass) | CaCO₃ (% by mass) |
|---|---|---|
| Example 11 | 0.40 | 0.55 |
| Example 12 | 0.40 | 0.50 |
| Example 13 | 0.40 | 0.45 |
| Example 14 | 0.40 | 0.40 |
| Example 15 | 0.35 | 0.50 |
| Example 16 | 0.35 | 0.45 |
| Example 17 | 0.35 | 0.40 |
| Example 18 | 0.35 | 0.35 |

Examples 19-26

Investigate 2 of Prior-Addition of Ba, and Amount of CaCO₃ Added when Pulverizing SiO₂

Using $CaCO_3$ powder, $La(OH)_3$ powder, $BaCO_3$ powder, $α-Fe_2O_3$ powder and $Co_3O_4$ powder as in Example 1, a composition of $Ca_{1-x-y}La_xBa_yFe_{2n-z}Co_zO_{19}$, wherein x=0.475, y=0.050, z=0.3, and n=5.3, was formulated. 0.1 parts by mass of $H_3BO_3$ powder was added to 100 parts by mass of the resultant mixture and wet-mixed. The mixture was calcined art 1473 K for 1 hour in the air. The resultant calcined body was coarsely pulverized, and then subjected to dry coarse pulverization with a vibration mill to obtain coarse powder having an average particle size of 5 μm (by F.S.S.S.). 0.40 parts by mass of $SiO_2$ powder and 0.55 parts by mass of $CaCO_3$ powder, per 100 parts by mass of coarse calcined powder, were added to 45% by mass of coarse powder and 55% by mass of water, and wet fine pulverization was conducted with a ball mill to obtain the slurry of Example 19 containing fine ferrite particles having an average particle size of 0.81 μm (by F.S.S.S.).

Figure 10A:
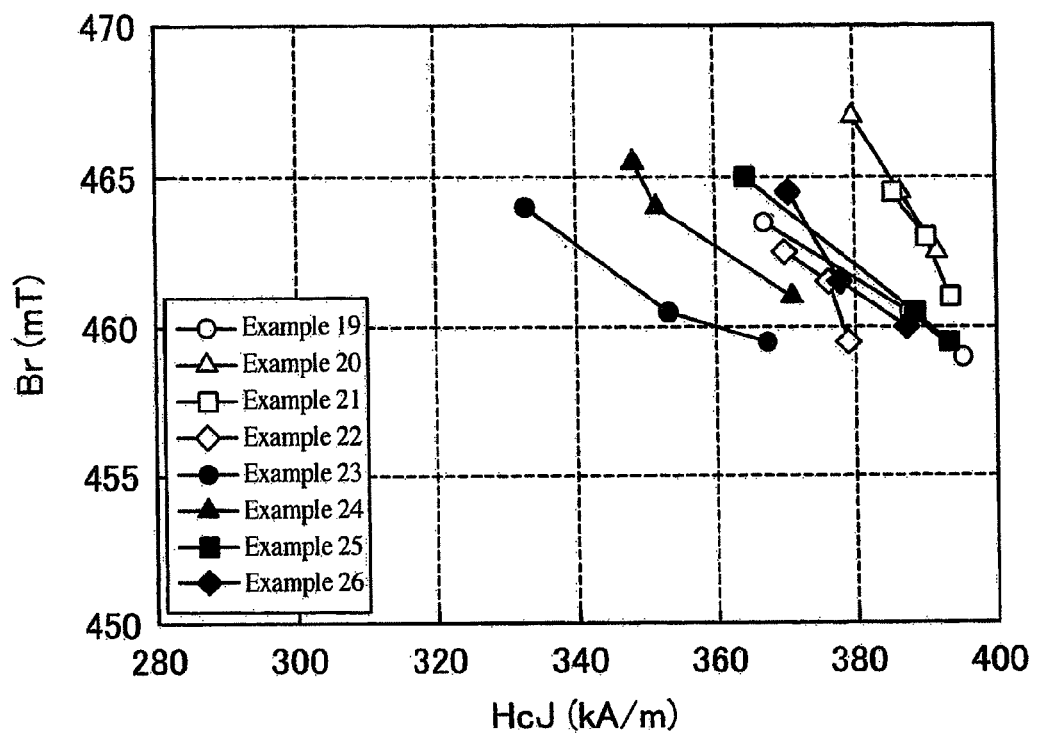
FIG. 10(a) is a graph showing the magnetic properties of the sintered ferrite magnets of Examples 19-26, in which three points in each case indicate experimental results obtained on the same composition at different sintering temperatures of 1473K, 1483K and 1493K from the right.
Figure 10B:
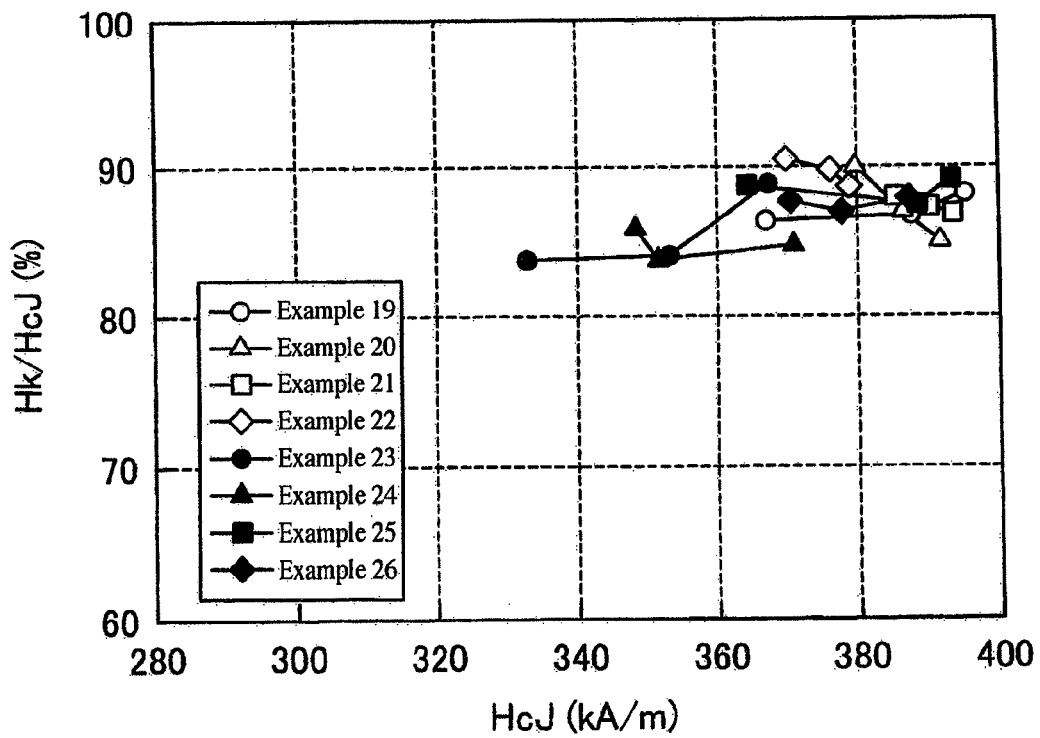
FIG. 10(b) is a graph showing the magnetic properties of the sintered ferrite magnets of Examples 19-26, in which three points in each case indicate experimental results obtained on the same composition at different sintering temperatures of 1473K, 1483K and 1493K from the right.

Further, the slurries of Examples 20-26 were produced in the same manner as in Example 19 except for using the compositions of $SiO_2$ and $CaCO_3$ shown in Table 5. The resultant eight types of slurries were formed into anisotropic, sintered ferrite magnets in the same manner as in Example 1 in the magnetic-field molding et seq. FIGS. 10(a) and 10(b) show their magnetic properties, and Table 2 and 3 show the analyzed values of the sintered bodies. As is clear from FIGS. 10(a) and 10(b), anisotropic, sintered ferrite magnets having Br exceeding 460 mT were obtained in any of Examples 19-26, meaning that as high Br as not achieved by conventional SrM was obtained.

TABLE 5

| No. | SiO₂ (% by mass) | CaCO₃ (% by mass) |
|---|---|---|
| Example 19 | 0.40 | 0.55 |
| Example 20 | 0.40 | 0.50 |
| Example 21 | 0.40 | 0.45 |
| Example 22 | 0.40 | 0.40 |
| Example 23 | 0.35 | 0.50 |
| Example 24 | 0.35 | 0.45 |
| Example 25 | 0.35 | 0.40 |
| Example 26 | 0.35 | 0.35 |

Example 27

Investigation of Prior-Addition of Ba and Amount of Co Prior-Added

Figure 11A:
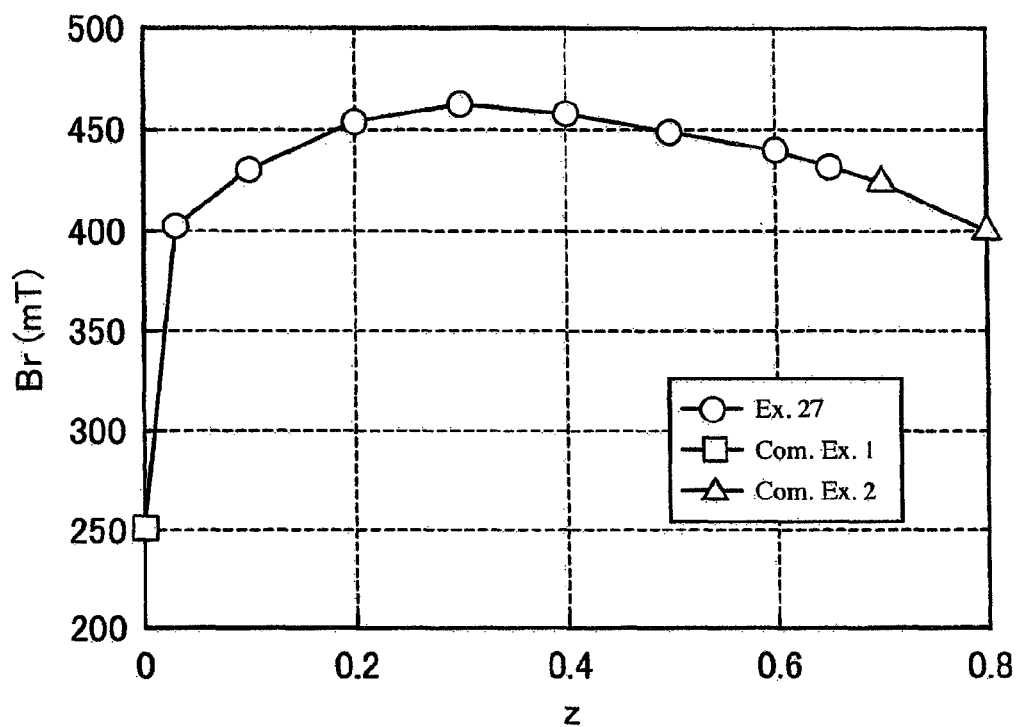
FIG. 11(a) is a graph showing the relation between z and a residual magnetic flux density Br in the sintered ferrite magnets of Example 27 and Comparative Examples 1 and 2.
Figure 11B:
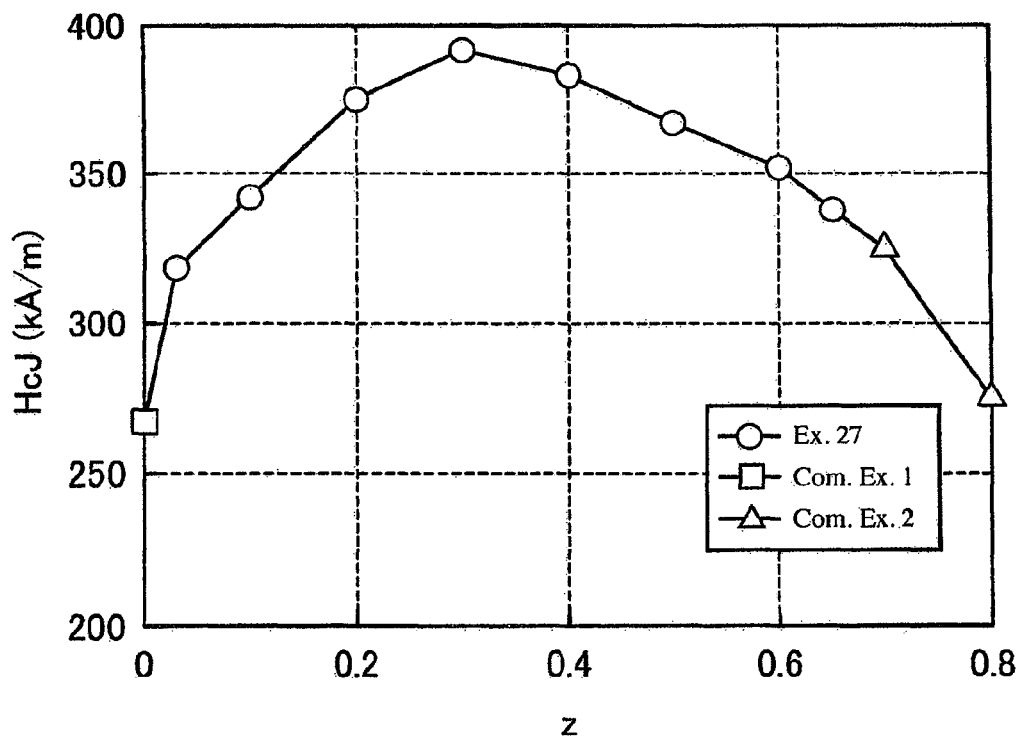
FIG. 11(b) is a graph showing the relation between z and coercivity HcJ in the sintered ferrite magnets of Example 27 and Comparative Examples 1 and 2.

The same $CaCO_3$ powder, $La(OH)_3$ powder, $BaCO_3$ powder, $\alpha\text{-}Fe_2O_3$ powder and $Co_3O_4$ powder as in Example 1 were formulated to a composition of $Ca_{1-x-y}La_xBa_yFe_{2n-z}Co_zO_{19}$, wherein x=0.475, y=0.050, z=0.03, 0.1, 0.2, 0.3, 0.4, 0.5, 0.6, and 0.65, and n=5.3. 0.1 parts by mass of $H_3BO_3$ powder was added to 100 parts by mass of each of eight types of formulations and wet-mixed. Eight types of the resultant mixtures were mixed, and calcined at 1473 K for 1 hour in the air. The resultant samples were named as Examples 27-1 to 27-8 in the ascending order of z. With the subsequent steps in the same manner as in Example 1, each calcined body was pulverized, molded in a magnetic field, sintered and machined. Fine ferrite particles were adjusted to have an average particle size of 0.81 μm after pulverization. As the sintering conditions, heating was conducted at 1493 K for 1 hour in the air. FIGS. 11(a) and 11(b) show their magnetic properties, and Tables 2 and 3 show the analyzed values of the sintered bodies.

Comparative Example 1

Addition of No Co

A sintered ferrite magnet was produced to measure its magnetic properties in the same manner as in Example 27 except for changing the calcined body composition to $Ca_{1-x-y}La_xBa_yFe_{2n-z}Co_zO_{19}$, wherein x=0.475, y=0.050, z=0, and n=5.3. FIGS. 11(a) and 11(b) show its magnetic properties.

Comparative Example 2

Too much Co Added

A sintered ferrite magnet was produced to measure its magnetic properties in the same manner as in Example 27 except for changing the calcined body composition to $Ca_{1-x-y}La_xBa_yFe_{2n-z}Co_zO_{19}$, wherein x=0.475, y=0.050, z=0.7 and 0.8, and n=5.3. FIGS. 11(a) and 11(b) show its magnetic properties. Samples in which z was 0.7 and 0.8, respectively, were named as Comparative Examples 2-1 and 2-2. It is clear from FIGS. 11(a) and 11(b) that Examples 27-1 to 27-8 in which the Co content (z) was 0.03-0.65 had higher magnetic properties than those of Comparative Example 1 containing no Co and Comparative Example 2 containing too much Co.

Example 28

Average Particle Size of Finely Pulverized Powder and Magnetic Properties

Figure 12A:
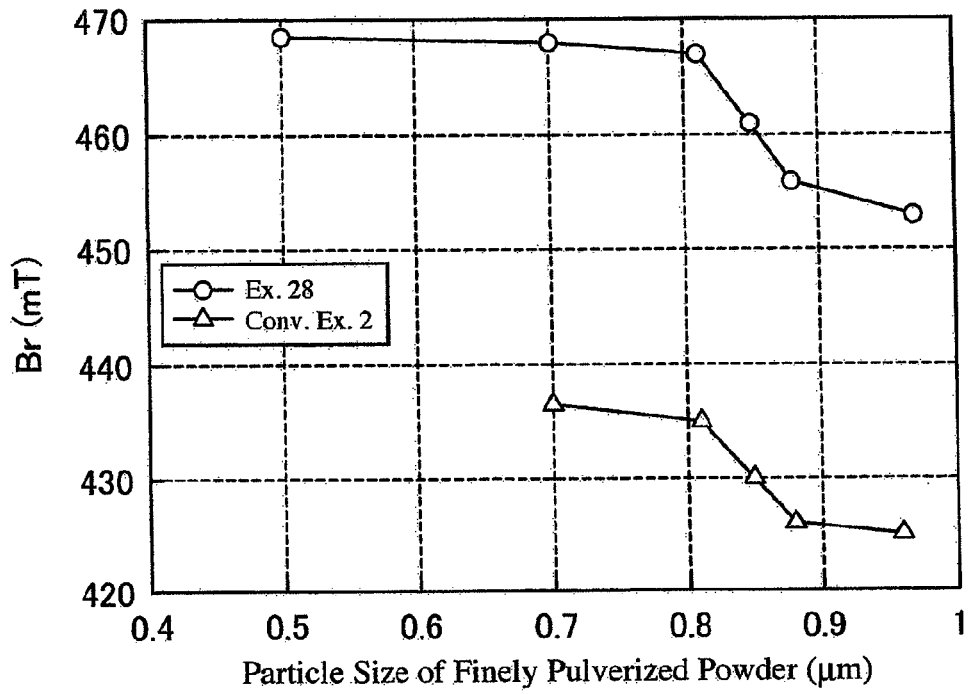
FIG. 12(a) is a graph showing the relation between the particle size of finely pulverized powder and a residual magnetic flux density Br in the sintered ferrite magnets of Example 28 and Conventional Example 2.
Figure 12B:
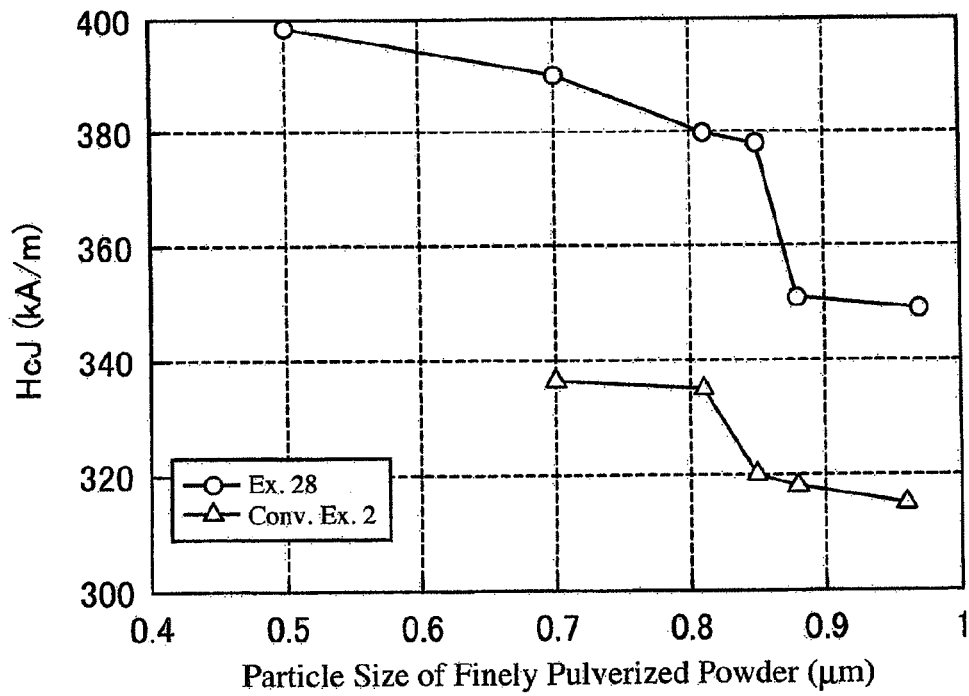
FIG. 12(b) is another graph showing the relation between the particle size of finely pulverized powder and coercivity HcJ in the sintered ferrite magnets of Example 28 and Conventional Example 2.

The same $CaCO_3$ powder, $La(OH)_3$ powder, $BaCO_3$ powder, $\alpha\text{-}Fe_2O_3$ powder and $Co_3O_4$ powder as in Example 1 were formulated to a composition of $Ca_{1-x-y}La_xBa_yFe_{2n-z}Co_zO_{19}$, wherein x=0.475, y=0.050, z=0.30, and n=5.3. 0.1 parts by mass of $H_3BO_3$ powder was added to 100 parts by mass of the resultant formulation and wet-mixed. The resultant mixture was dried, and then calcined at 1473 K for 1 hour in the air. The calcined body was coarsely pulverized, and then subjected to dry coarse pulverization to obtain coarse powder having an average particle size of 5 μm (by F.S.S.S.). 45% by mass of the coarse powder and 55% by mass of water were charged into a ball mill, and with 0.4 parts by mass of $SiO_2$ powder and 0.5 parts by mass of $CaCO_3$ powder added as sintering aids per 100 parts by mass of the coarse calcined powder, wet fine pulverization was conducted. With the fine pulverization time changed, slurries containing six types of fine ferrite particles having average particle sizes of 0.97 μm, 0.88 μm, 0.85 μm, 0.81 μm, 0.7 μm and 0.5 μm (by F.S.S.S.) were obtained. Six types of slurries after fine pulverization were compression-molded in a parallel magnetic field of 796 kA/m under molding pressure of 0.4 ton/cm². The resultant disk-shaped green bodies each having an outer diameter of 40 mm and a thickness of 15 mm were sintered at 1493K for 1 hour in the air and machined. FIGS. 12(a) and 12(b) show their magnetic properties at room temperature (20° C.), and Table 2 and 3 show the analyzed values of the sintered bodies.

Conventional Example 2

Average Particle Size of Finely Pulverized Powder and Magnetic Properties

In the wet fine pulverization of calcined, coarse powder produced in Conventional Example 1 with water as a medium with a ball mill, the fine pulverization time was adjusted to obtain slurries containing five types of fine ferrite particles having average particle sizes of 0.96 μm, 0.88 μm, 0.85 μm, 0.82 μm and 0.7 μm (by F.S.S.S.). With the subsequent steps in the same manner as in Conventional Example 1, sintered ferrite magnets were produced. FIGS. 12(a) and 12(b) show their magnetic properties.

It is clear from FIGS. 12(a) and 12(b) that when the average particle size of fine powder is 0.5-0.97 μm, the sintered ferrite magnet of Example 28 have remarkably high Br and HcJ. Particularly when the average particle size was 0.85 μm or less, Br was more than 460 mT, indicating higher Br characteristics than those of conventional SrM. Further, the sintered ferrite magnet of Example 28 advantageously has high Br and HcJ, even when using a slurry for molding having an average particle size of 0.8 μm or more, which provides good dewatering characteristics.

Example 29

Prior/Post-Addition of Ba

Figure 13A:
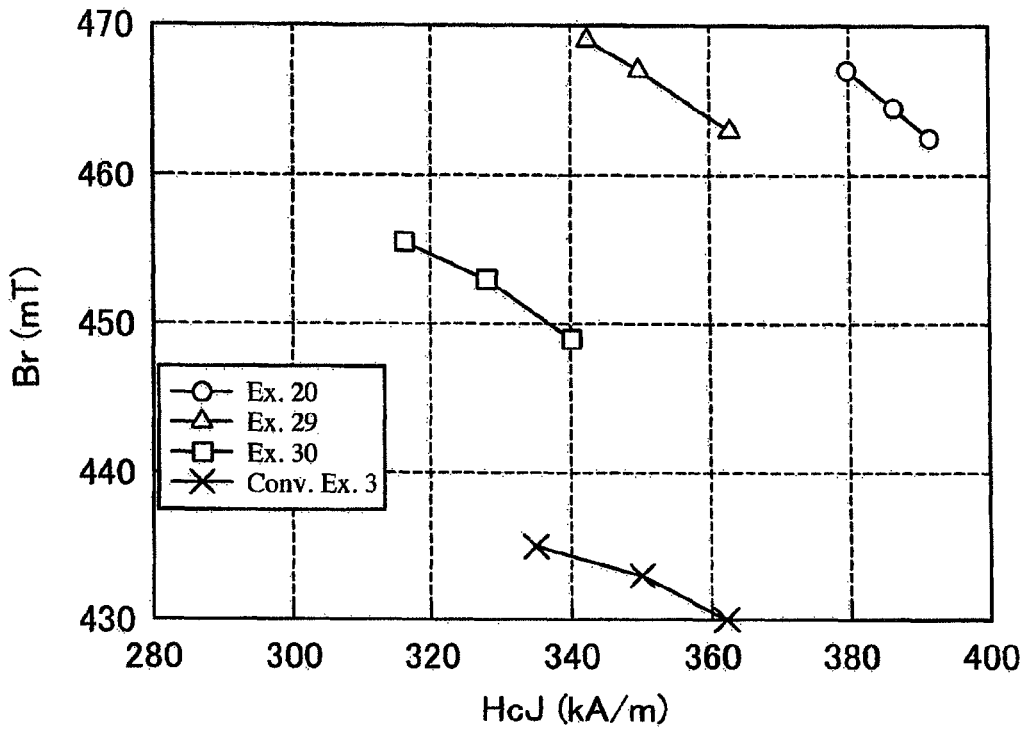
FIG. 13(a) is a graph showing the magnetic properties of the sintered ferrite magnets of Examples 20, 29, 30 and Conventional Example 3, in which three points in each case indicate experimental results obtained on the same composition at different sintering temperatures of 1473K, 1483K and 1493K from the right.
Figure 13B:
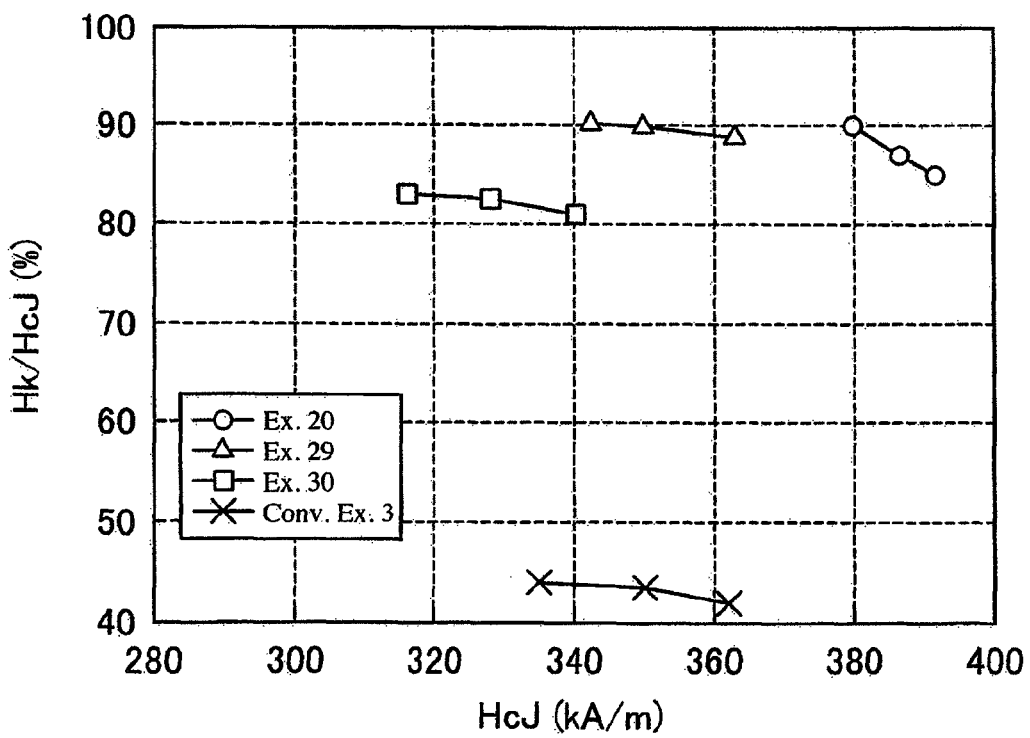
FIG. 13(b) is a graph showing the magnetic properties of the sintered ferrite magnets of Examples 20, 29, 30 and Conventional Example 3, in which three points in each case indicate experimental results obtained on the same composition at different sintering temperatures of 1473K, 1483K and 1493K from the right.

The same $CaCO_3$ powder, $La(OH)_3$ powder, $BaCO_3$ powder, $\alpha\text{-}Fe_2O_3$ powder and $Co_3O_4$ powder as in Example 1 were formulated to a composition of $Ca_{1-x-y}La_xBa_yFe_{2n-z}Co_zO_{19}$, x=0.475, y=0.025, z=0.3, and n=5.3. 0.1 parts by mass of $H_3BO_3$ powder, per 100 parts by mass of the formulation, was added and wet-mixed. The resultant mixture was dried and then calcined at 1473 K for 1 hour in the air. The resultant calcined body was coarsely pulverized, and then subjected to dry coarse pulverization to obtain coarse powder having an average particle size of 5 μm (by F.S.S.S.). 45% by mass of the coarse powder and 55% by mass of water were charged into a ball mill, and with 0.4 parts by mass of $SiO_2$ powder, 0.25 parts by mass of $CaCO_3$ powder and 0.5 parts by mass of $BaCO_3$ powder added to 100 parts by mass of the coarse powder, wet fine pulverization was conducted to obtain a slurry containing fine ferrite particles having an average particle size of 0.81 μm (by F.S.S.S.). With the subsequent steps in the same manner as in Example 1, an anisotropic, sintered ferrite magnet was produced from the resultant slurry. FIGS. 13(a) and 13(b) show its magnetic properties.

Example 30

Post-Addition of Ba

The same $CaCO_3$ powder, $La(OH)_3$ powder, $BaCO_3$ powder, $\alpha$-$Fe_2O_3$ powder and $Co_3O_4$ powder as in Example 1 were formulated to a composition of $Ca_{1-x-y}La_xBa_yFe_{2n-z}Co_zO_{19}$, x=0.475, y=0, z=0.3, and n=5.3. 0.1 parts by mass of $H_3BO_3$ powder was added to 100 parts by mass of the formulation and wet-mixed. The resultant mixture was dried and then calcined at 1473 K for 1 hour in the air. The resultant calcined body was coarsely pulverized, and then subjected to dry coarse pulverization to obtain coarse powder having an average particle size of 5 μm (by F.S.S.S.). 45% by mass of the coarse powder and 55% by mass of water were charged into a ball mill, and with 0.4 parts by mass of $SiO_2$ powder and 1.0 parts by mass of $BaCO_3$ powder added per 100 parts by mass of the coarse powder, wet fine pulverization was conducted to obtain a slurry containing fine ferrite particles having an average particle size of 0.81 μm (by F.S.S.S.). With the same magnetic-field molding step and subsequent steps in the same manner as in Example 1, the slurry was formed into an anisotropic, sintered ferrite magnet. FIGS. 13(a) and 13(b) show its magnetic properties.

Conventional Example 3

In the wet fine pulverization of the calcined, coarse powder produced in Conventional Example 1 with water as a medium with a ball mill, the fine pulverization time was adjusted to obtain a slurry containing fine ferrite particles having an average particle size of 0.81 μm (by F.S.S.S.). With the subsequent steps in the same manner as in Conventional Example 1, a sintered ferrite magnet was produced. FIGS. 13(a) and 13(b) show its magnetic properties. FIGS. 13(a) and 13(b) indicate that Example 29 in which Ba was prior/post-added, and Example 30 in which Ba was post-added had slightly lower HcJ than that of Example 20 in which Ba was prior-added, but higher HcJ than that of Conventional 120 Example 3 in which Ba was not added, verifying that even the post-addition of Ba provides a large effect of improving magnetic properties.

Example 31

Prior-Addition of Ba, and Prior/Post-Addition of Co

Figure 14A:
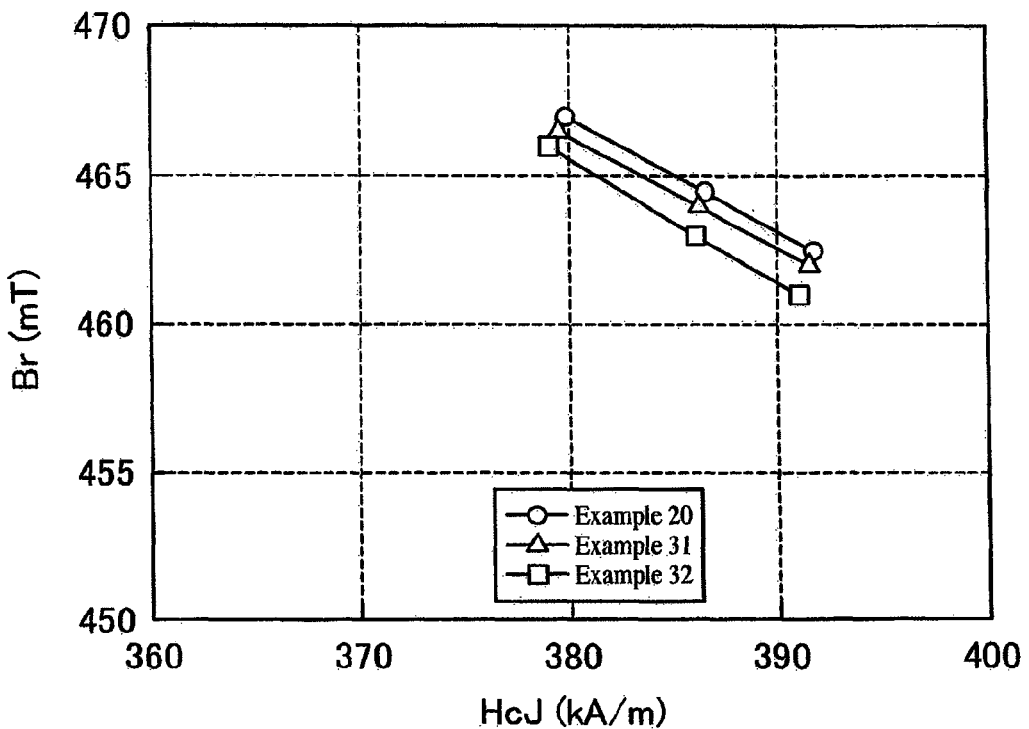
FIG. 14(a) is a graph showing the magnetic properties of the sintered ferrite magnets of Examples 20, 31, 32, in which three points in each case indicate experimental results obtained on the same composition at different sintering temperatures of 1473K, 1483K and 1493K from the right.
Figure 14B:
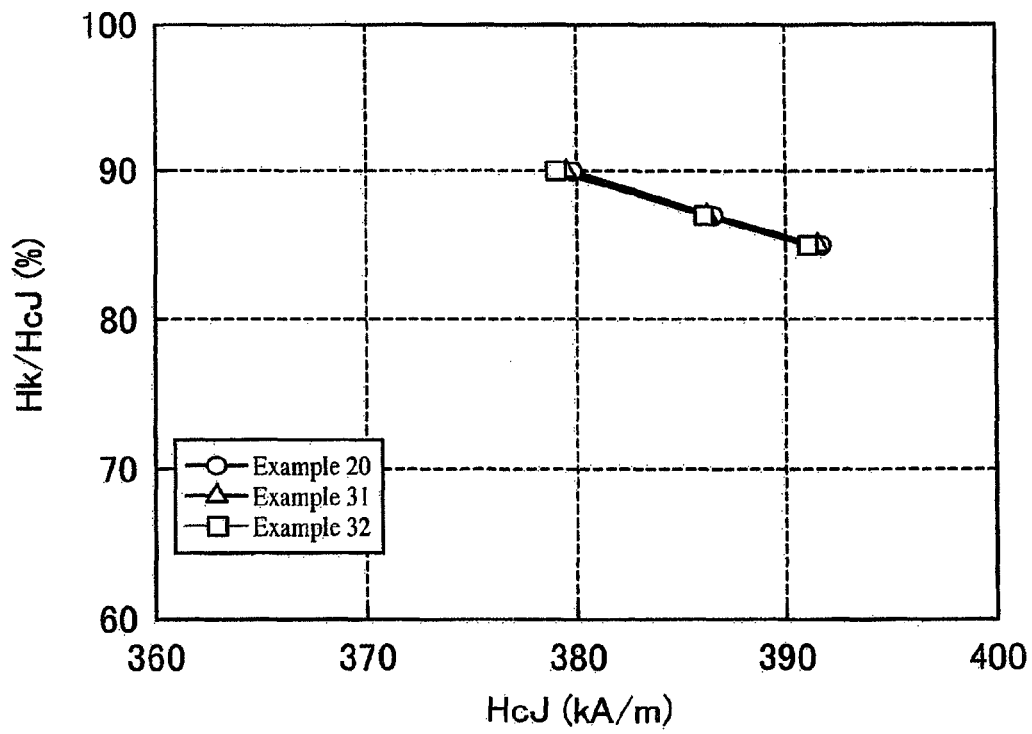
FIG. 14(b) is a graph showing the magnetic properties of the sintered ferrite magnets of Examples 20, 31, 32, in which three points in each case indicate experimental results obtained on the same composition at different sintering temperatures of 1473K, 1483K and 1493K from the right.

The same $CaCO_3$ powder, $La(OH)_3$ powder, $BaCO_3$ powder, $\alpha$-$Fe_2O_3$ powder and $Co_3O_4$ powder as in Example 1 were formulated to a composition of $Ca_{1-x-y}La_xBa_yFe_{2n-z}Co_zO_{19}$, wherein x=0.475, y=0.050, z=0.15, n=5.3. 0.1 parts by mass of $H_3BO_3$ powder was added to 100 parts by mass of the resultant formulation, and wet-mixed. The resultant mixture was dried and then calcined at 1473 K for 1 hour in the air. The resultant calcined body was coarsely pulverized, and then subjected to dry coarse pulverization to obtain coarse powder having an average particle size of 5 μm (by F.S.S.S.). 45% by mass of the coarse powder and 55% by mass of water were charged into a ball mill, and with 0.4 parts by mass of $SiO_2$ powder, 0.5 parts by mass of $CaCO_3$ powder and 1.5 parts by mass of $Co(OH)_2$ powder added per 100 parts by mass of the coarse powder, the mixture was subjected to wet fine pulverization to obtain a slurry containing fine ferrite particles having an average particle size of 0.81 μm (by F.S.S.S.). With the subsequent steps in the same manner as in Example 1, an anisotropic, sintered ferrite magnet was produced from the slurry. FIGS. 14(a) and 14(b) show its magnetic properties.

Example 32

Prior-Addition of Ba, and Post-Addition of Co

The same $CaCO_3$ powder, $La(OH)_3$ powder, $BaCO_3$ powder, $\alpha$-$Fe_2O_3$ powder and $Co_3O_4$ powder as in Example 1 were formulated to a composition of $Ca_{1-x-y}La_xBa_yFe_{2n-z}Co_zO_{19}$, wherein x=0.475, y=0.050, z=0, and n=5.3. 0.1 parts by mass of $H_3BO_3$ powder was added to 100 parts by mass of the formulation and wet-mixed. The resultant mixture was dried and then calcined at 1473 K for 1 hour in the air. The resultant calcined body was coarsely pulverized, and then subjected to dry coarse pulverization to obtain coarse powder having an average particle size of 5 μm (by F.S.S.S.). 45% by mass of the coarse powder and 55% by mass of water were charged into a ball mill, and with 0.4 parts by mass of $SiO_2$ powder, 0.5 parts by mass of $CaCO_3$ powder and 3.0 parts by mass of $Co(OH)_2$ powder added per 100 parts by mass of the coarse powder, the mixture was subjected to wet fine pulverization to obtain a slurry containing fine ferrite particles having an average particle size of 0.81 μm (by F.S.S.S.). With the same magnetic-field molding step and subsequent steps in the same manner as in Example 1, an anisotropic, sintered ferrite magnet was produced from the slurry. FIGS. 14(a) and 14(b) show its magnetic properties.

FIGS. 14(a) and 14(b) indicate that although Example 20 in which Ba and Co were prior-added had the highest magnetic properties, Example 31 in which Ba was prior-added, and Co was prior/post-added, and Example 32 in which Ba was prior-added, and Co was post-added had substantially as high magnetic properties as those of Example 20.

Example 33

Investigation of Prior-Addition of Ba and Amount of La Prior-Added

Figure 15A:
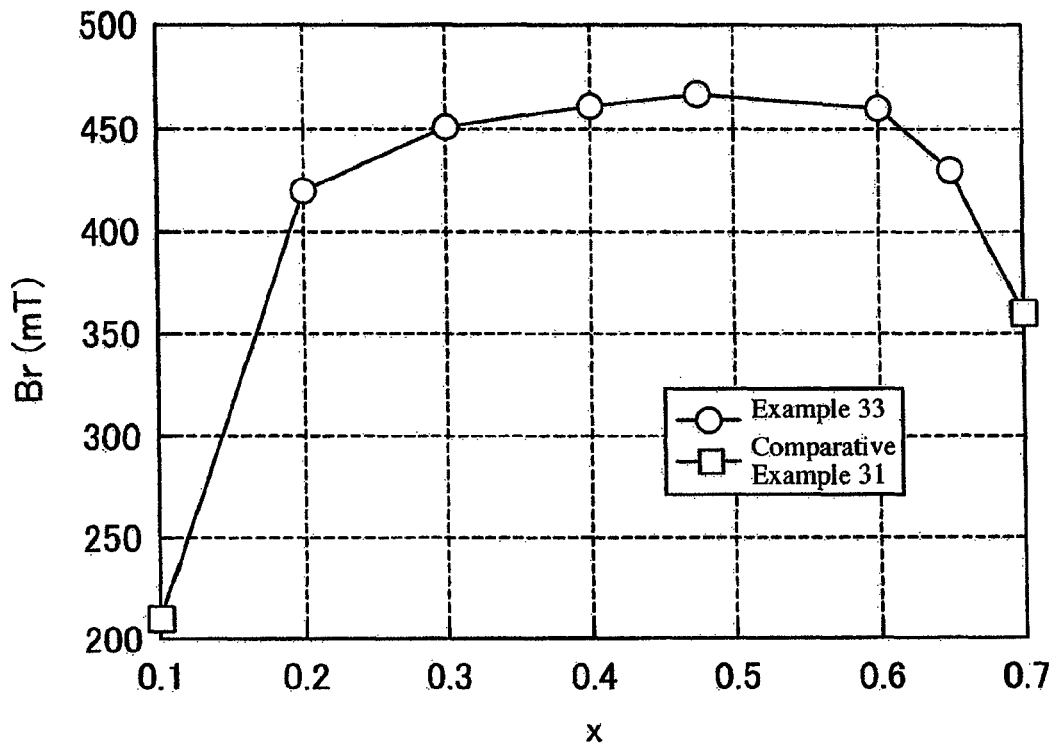
FIG. 15(a) is a graph showing the relation between x and a residual magnetic flux density Br in the sintered ferrite magnets of Example 33 and Comparative Example 3.
Figure 15B:
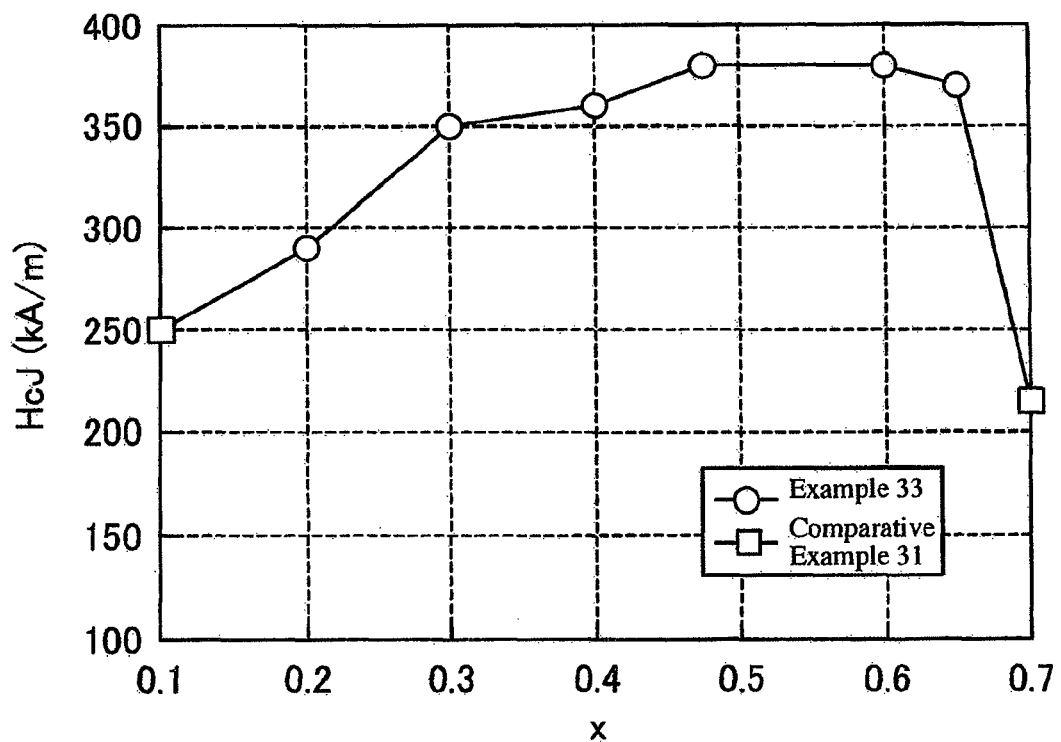
FIG. 15(b) is another graph showing the relation between x and coercivity HcJ in the sintered ferrite magnets of Example 33 and Comparative Example 3.

The same $CaCO_3$ powder, $La(OH)_3$ powder, $BaCO_3$ powder, $\alpha$-$Fe_2O_3$ powder and $Co_3O_4$ powder as in Example 1 were formulated to a composition of $Ca_{1-x-y}La_xBa_yFe_{2n-z}Co_zO_{19}$, wherein x=0.2, 0.3, 0.4, 0.47, 0.6, and 0.65, y=0.050, z=0.30, and n=5.3. 0.1 parts by mass of $H_3BO_3$ powder was added to 100 parts by mass of each of six types of formulations and wet-mixed. Six types of the resultant mixtures were dried and then calcined at 1473 K for 1 hour in the air. The resultant samples were named as Examples 33-1 to 33-6 in the ascending order of x. With the subsequent steps in the same manner as in Example 1, each calcined body was pulverized, molded in a magnetic field, sintered, machined and measured with respect to magnetic properties. The sintering conditions were heating at 1493K for 1 hour in the air. FIGS. 15(a) and 15(b) show their magnetic properties.

Comparative Example 3

Prior-Addition of Ba, too Little or too Much La Prior-Added

Compositions of $Ca_{1-x-y}La_xBa_yFe_{2n-z}Co_zO_{19}$, wherein x=0.1 and 0.7, y=0.050, z=0.30, n=5.3, were formulated. 0.1 parts by mass of $H_3BO_3$ powder was added to 100 parts by mass of each of the resultant two types of formulations, and wet-mixed. Two types of the resultant mixtures were dried and then calcined at 1473 K for 1 hour in the air. With the subsequent steps in the same manner as in Example 33, an anisotropic, sintered ferrite magnet was produced from the calcined body. FIGS. 15(a) and 15(b) show their magnetic properties. It is clear from FIGS. 15(a) and 15(b) that Comparative Example 3 having compositions, in which the amount of La prior-added was too little or too much, had low magnetic properties.

Example 34

Prior-Addition of Ba, No Ba Added at Calcining

The same $CaCO_3$ powder, $La(OH)_3$ powder, $BaCO_3$ powder, $\alpha\text{-}Fe_2O_3$ powder and $Co_3O_4$ powder as in Example 1 were formulated to a composition of $Ca_{1-x-y}La_xBa_yFe_{2n-z}Co_zO_{19}$, wherein x=0.475, y=0.050, z=0.300, and n=5.3. The formulation was wet-mixed and then dried. It was then calcined at 1473 K for 1 hour in the air. The resultant calcined body was coarsely pulverized, and then subjected to dry coarse pulverization to obtain coarse powder having an average particle size of 5 μm (by F.S.S.S.). 45% by mass of the coarse powder and 55% by mass of water were charged into a ball mill, and with 0.4 parts by mass of $SiO_2$ powder and 0.5 parts by mass of $CaCO_3$ powder added per 100 parts by mass of the coarse powder, wet fine pulverization was conducted to obtain a slurry containing fine ferrite particles having an average particle size of 0.81 μm (by F.S.S.S.). With the subsequent steps in the same manner as in Example 1, a sintered ferrite magnet was produced from the slurry. The sintering conditions were heating at 1493K for 1 hour in the air. Table 6 shows its magnetic properties.

Example 35

Prior-Addition of Ba, $SiO_2$ Added at Calcining

A composition of $Ca_{1-x-y}La_xBa_yFe_{2n-z}Co_zO_{19}$, wherein x=0.475, y=0.050, z=0.300, and n=5.3 was formulated in the same manner as in Example 34. 0.1 parts by mass of $SiO_2$ powder was added to 100 parts by mass of the formulation, wet-mixed and then dried. It was then calcined at 1473 K for 1 hour in the air. With the subsequent steps in the same manner as in Example 34, an anisotropic, sintered ferrite magnet was produced. Table 6 shows its magnetic properties.

TABLE 6

| Sample No. | Additives at Calcining (% by mass) | | Magnetic Properties | | |
|---|---|---|---|---|---|
| | $H_3BO_3$ | $SiO_2$ | Br (mT) | HcJ (kA/m) | Hk/HcJ (%) |
| Example 20 | 0.1 | 0 | 467 | 380 | 90.0 |
| Example 34 | 0 | 0 | 468 | 320 | 92.1 |
| Example 35 | 0 | 0.1 | 465 | 382 | 88.3 |

As is clear from Table 6, in both Example 34 with no additive at the time of calcining, and Example 35 in which a predetermined amount of $SiO_2$ was add at the time of calcining, as high Br as more than 460 more than was obtained.

Examples 36-39, Comparative Example 4

Prior-Addition of Ba, and Permitted Amount of Sr

The same $CaCO_3$ powder, $La(OH)_3$ powder, $BaCO_3$ powder, $\alpha\text{-}Fe_2O_3$ powder and $Co_3O_4$ powder, and $SrCO_3$ powder as in Example 1 were formulated to compositions of $Ca_{0.475}La_{0.475}Ba_{0.045}Sr_{0.005}Fe_{10.300}Co_{0.3}O_{19}$ ($Ca_{1-x-y}La_xBa_{y-a}Sr_aFe_{2n-z}Co_zO_{19}$, wherein x=0.475, y=0.050, z=0.300, a=0.005-0.040, n=5.3), as shown in Table 7. 0.1% by mass of $H_3BO_3$ was added relative to the resultant formulation, wet-mixed and then dried. It was then calcined at 1473 K for 1 hour in the air. With the subsequent steps in the same manner as in Example 1 an anisotropic, sintered ferrite magnet was produced from the calcined body. Fine powder after wet fine pulverization had an average particle size of 0.81 μm (by F.S.S.S.). The sintering of the resultant green body was conducted under the conditions of heating at 1493K for 1 hour in the air. Table 7 shows their magnetic properties.

TABLE 7

| Sample No. | a | Sr/(Ba + Sr) (%) | Br (mT) | HcJ (KA/m) |
|---|---|---|---|---|
| Example 20 | 0 | 0 | 467 | 380 |
| Example 36 | 0.005 | 10 | 466 | 375 |
| Example 37 | 0.010 | 20 | 465 | 365 |
| Example 38 | 0.020 | 40 | 463 | 345 |
| Example 39 | 0.025 | 50 | 462 | 330 |
| Comparative Example 4 | 0.040 | 80 | 450 | 255 |

It is clear from Table 7 that practically high Br was obtained even in Examples 36-39, in which 50% or less of Ba was substituted with Sr.

Example 40

Prior-Addition of Ba, and Sintering in Oxygen Atmosphere

The same $CaCO_3$ powder, $La(OH)_3$ powder, $BaCO_3$ powder, $\alpha\text{-}Fe_2O_3$ powder and $Co_3O_4$ powder as in Example 1 were formulated to a composition of $Ca_{1-x-y}La_xBa_yFe_{2n-z}Co_zO_{19}$, wherein x=0.475, y=0.050, z=0.300, and n=5.3. $H_3BO_3$ was added to 0.1% by mass of the formulation, wet-mixed and then dried. It was then calcined at 1473 K for 1 hour in the air. With the subsequent steps in the same manner as in Example 1, an anisotropic, sintered ferrite magnet was produced from the resultant calcined body. Fine powder after wet fine pulverization had an average particle size of 0.81 μm (by F.S.S.S.). The sintering conditions of the green body were heating at 1493 K and at an oxygen partial pressure of 1 atm for 1 hour. Table 8 shows its magnetic properties.

TABLE 8

| Sample No. | Oxygen Partial Pressure During Sintering (atm) | Br (mT) | HcJ (kA/m) |
|---|---|---|---|
| Example 20 | 0.2 | 467 | 380 |
| Example 40 | 1.0 | 468 | 435 |

It is clear from Table 8 that higher magnetic properties are obtained by sintering in an oxygen atmosphere than in the air.

Examples 41-43

Investigation of Prior-Addition of Ba, and Mixed Rare Earth Materials (R=La, Ce, Pr, and Nd)

$CaCO_3$ powder, three types of the R starting material powders (blends of two of La oxide powder, Ce oxide powder, Pr oxide powder and Nd oxide powder) shown in Table 9, BaCO$_3$ powder, α-Fe$_2$O$_3$ powder and Co$_3$O$_4$ powder were formulated to compositions of Ca$_{1-x-y}$R$_x$Ba$_y$Fe$_{2n-z}$Co$_z$O$_{19}$, wherein x=0.475, y=0.050, z=0.300, and n=5.3. 0.1% by mass of H$_3$BO$_3$ was added relative to each formulation, wet-mixed and then dried. It was then calcined at 1473 K for 1 hour in the air. With the subsequent steps in the same manner as in Example 1, an anisotropic, sintered ferrite magnet was produced from each calcined body. Fine powder after wet fine pulverization had an average particle size of 0.81 μm (by F.S.S.S.). The sintering conditions of a green body were heating at 1493 K for 1 hour in the air. Table 9 shows their magnetic properties.

TABLE 9

| Sample No. | R | Br (mT) | HcJ (kA/m) |
|---|---|---|---|
| Example 20 | 100% La | 467 | 380 |
| Example 41 | 90% La + 10% Ce | 430 | 330 |
| Example 42 | 90% La + 10% Pr | 429 | 387 |
| Example 43 | 90% La + 10% Nd | 431 | 346 |

It is clear from Table 9 that high magnetic properties are obtained even when R comprises 90% of La and 10% of Ce, Pr or Nd.

EFFECT OF THE INVENTION (1) An oxide-type, magnetic material (calcined body) in a hexagonal plate shape with a high growth rate of primary crystal particles and its production method have been found, thereby providing a green body resistant to cracking, and a high-performance, anisotropic, sintered ferrite magnet having extremely high Br and HcJ, which are close to inherent magnetic properties predicted by 4πIs and H$_A$.

(2) The anisotropic, sintered ferrite magnet of the present invention can be provided with extremely high Br and HcJ even when fine powder having a relatively large particle size is used for molding efficiency, thereby satisfying both high magnetic performance and high productivity.

What is claimed is:

1. An oxide-type, magnetic material based on ferrite having a hexagonal structure, comprising Ca, an R element which is at least one rare earth element indispensably including La, Ba, Sr, Fe and Co as indispensable elements, the composition ratios of Ca, R, Ba, Sr, Fe and Co being represented by the following general formula:

Ca$_{1-x-y}$R$_x$(Ba$_{1-a}$Sr$_a$)$_y$Fe$_{2n-z}$Co$_z$ (by atomic ratio), wherein (1−x−y), x, y, a, z and n are numbers representing the amounts of Ca, the R element, Ba, Sr and Co and a molar ratio, respectively, meeting the following conditions:

0.2≦x≦0.65, 0.001≦y≦0.2, 0.3≦1−x−y≦0.6,

0<a≦0.5, 0.03≦z≦0.65, and

4≦n≦7, wherein it contains 0.05 to 0.2% by mass (calculated as B$_2$O$_3$) of B.

2. A method for producing an oxide-type, magnetic material based on ferrite having a hexagonal structure and comprising Ca, an R element which is at least one rare earth element indispensably including La, Ba, Sr, Fe and Co as indispensable elements, the composition ratios of Ca, R, Ba, Sr, Fe and Co being represented by the following general formula:

Ca$_{1-x-y}$R$_x$(Ba$_{1-a}$Sr$_a$)$_y$Fe$_{2n-z}$Co$_z$ (by atomic ratio), wherein (1−x−y), x, y, a, z and n are numbers representing the amounts of Ca, the R element, Ba, Sr and Co and a molar ratio, respectively, meeting the following conditions:

0.2≦x≦0.65, 0.001≦y≦0.2, 0.3≦1−x−y≦0.6,

0<a≦0.5, 0.03≦z≦0.65, and

4≦n≦7, wherein it contains 0.05 to 0.2% by mass (calculated as B$_2$O$_3$) of B, said method comprising the steps of mixing a Ca compound, an R compound, a Ba compound, a Sr compound, an iron compound and a Co compound, 0.05 to 0.2% by mass of a boron compound per 100 parts by mass of the resultant mixture is added, and calcining the resultant mixture.

* * * * *